United States Patent
Sim et al.

(10) Patent No.: US 12,493,327 B2
(45) Date of Patent: Dec. 9, 2025

(54) DISPLAY APPARATUS

(71) Applicant: Samsung Display Co., Ltd., Yongin-si (KR)

(72) Inventors: Jinyong Sim, Yongin-si (KR); Mansik Myung, Yongin-si (KR); Sungchul Choi, Yongin-si (KR); Insoo Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/399,301

(22) Filed: Dec. 28, 2023

(65) Prior Publication Data

US 2024/0219969 A1    Jul. 4, 2024

(30) Foreign Application Priority Data

Dec. 29, 2022    (KR) .................... 10-2022-0189730

(51) Int. Cl.
*G06F 1/16*    (2006.01)

(52) U.S. Cl.
CPC .......... *G06F 1/1656* (2013.01); *G06F 1/1624* (2013.01)

(58) Field of Classification Search
CPC ............................. G06F 1/1656; G06F 1/1624
See application file for complete search history.

(56) References Cited

U.S. PATENT DOCUMENTS

| | | | |
|---|---|---|---|
| 11,348,488 B2 | 5/2022 | Jang | |
| 11,497,130 B2 * | 11/2022 | Song | G06F 1/1624 |
| 11,805,607 B2 | 10/2023 | Jang | |
| 2021/0385315 A1 * | 12/2021 | Cha | G06F 1/1675 |
| 2022/0159847 A1 | 5/2022 | Ahn et al. | |
| 2022/0201880 A1 * | 6/2022 | Choi | G06F 1/1637 |
| 2022/0231239 A1 | 7/2022 | Ryu et al. | |

(Continued)

FOREIGN PATENT DOCUMENTS

| | | |
|---|---|---|
| EP | 4 095 649 | 11/2022 |
| KR | 10-2021-0126175 | 10/2021 |
| KR | 10-2306982 | 10/2021 |

(Continued)

OTHER PUBLICATIONS

"Samsung Slowly Advances their Next-Gen Smartwatch that Will Support a Much Wider Flexible Display", Patently Mobile website retrieved on Apr. 28, 2023 : https://www.patentlymobile.com/2015/04/samsung-slowly-advances-their-next-gen-smartwatch-that-will-support-a-much-wider-flexible-display.html.

(Continued)

*Primary Examiner* — Allen L Parker
*Assistant Examiner* — Elisa Sasserath
(74) *Attorney, Agent, or Firm* — Sughrue Mion, PLLC

(57) ABSTRACT

Provided is a display apparatus. The display apparatus includes a case, a moving portion inserted into or withdrawn from the case, a multi-joint structure inserted into or withdrawn from the case, a display panel disposed on outer surfaces of the case and the multi-joint structure, maintained in a bent state on a side surface of the moving portion, and inserted into or withdrawn from the case in case that the moving portion moves, and an elastic portion disposed on a side surface of the multi-joint structure and configured to press the multi-joint structure toward a surface of the display panel on which an image is displayed.

20 Claims, 16 Drawing Sheets

(56) References Cited

U.S. PATENT DOCUMENTS

2022/0264754 A1*  8/2022  Kim ..................... G06F 1/1652
2023/0099802 A1   3/2023  An et al.

FOREIGN PATENT DOCUMENTS

| KR | 10-2021-0150308 | 12/2021 |
| KR | 10-2022-0030865 | 3/2022 |
| KR | 10-2022-0040632 | 3/2022 |
| KR | 10-2022-0065952 | 5/2022 |
| KR | 10-2022-0066797 | 5/2022 |
| KR | 10-2022-0105690 | 7/2022 |
| KR | 10-2022-0115715 | 8/2022 |

OTHER PUBLICATIONS

Herlem, "Modelling and Manufacturing of a Composite Bi-Stable Boom for Small Satellites", KTH Royal Institute of Technology, Feb. 10, 2014, pp. 1-40.
Nicassio, "Shape prediction of bistable plates based on Timoshenko and Ashwell theories", Composite Structures, Feb. 2, 2021, pp. 113645, 1-5, vol. 265.

\* cited by examiner

DISPLAY APPARATUS

CROSS-REFERENCE TO RELATED APPLICATION(S)

This application claims priority to and benefits of Korean Patent Application No. 10-2022-0189730 under 35 U.S.C. § 119, filed on Dec. 29, 2022, in the Korean Intellectual Property Office, the entire contents of which are incorporated herein by reference.

BACKGROUND

1. Technical Field

One or more embodiments relate to an apparatus, and, to a display apparatus.

2. Description of the Related Art

Mobility-based electronic devices have been widely used. Recently, as mobile electronic devices, tablet personal computers (PCs) have been widely used in addition to small-sized electronic devices, such as mobile phones.

Such mobile electronic devices include display panels that support various functions and provide users with visual information, such as images or videos. Recently, as other components for driving display panels have been miniaturized, the proportion occupied by display panels in electronic devices has gradually increased, and a structure that may be bent to have a given angle from a flat state has been developed.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

A display apparatus in which a portion of a display panel is unfolded to increase a portion where an image is displayed, and how flat the display panel is maintained at the portion where the display panel is unfolded is a very important issue. Although various structures are arranged to maintain the display panel flat, it is considerably difficult to maintain side and central portions of the display panel flat. One or more embodiments include a display apparatus in which, by arranging an elastic portion at a side portion of a display panel, a screen of the display panel may be maintained flat in case that the display panel is unfolded.

Additional aspects will be set forth in part in the description which follows and, in part, will be apparent from the description, or may be learned by practice of the embodiments of the disclosure.

The technical objectives to be achieved by the disclosure are not limited to those described herein, and other technical objectives that are not mentioned herein would be clearly understood by a person skilled in the art from the description of the disclosure.

According to one or more embodiments, a display apparatus may include a case; a moving portion inserted into or withdrawn from the case; a multi-joint structure inserted into or withdrawn from the case; a display panel disposed on outer surfaces of the case and the multi-joint structure, maintained in a bent state on a side surface of the moving portion, and inserted into or withdrawn from the case in case that the moving portion moves; and an elastic portion disposed on a side surface of the multi-joint structure and configured to press the multi-joint structure toward a surface of the display panel on which an image is displayed.

In an embodiment, the display apparatus may further include a driver disposed between the moving portion and the case and configured to move the moving portion.

In an embodiment, a portion of the display panel disposed on the side surface of the moving portion may be substantially round.

In an embodiment, the elastic portion may have a substantially plate shape and may be substantially rounded to protrude toward the display panel.

In an embodiment, the elastic portion may include a metal or a carbon fiber-reinforced plastic.

In an embodiment, the display apparatus may further include a protective member disposed between the display panel and the multi-joint structure.

In an embodiment, the multi-joint structure may include support members and a locking portion disposed on each of the support members and having the elastic portion inserted into the locking portion.

In an embodiment, the support members may be disposed apart from each other.

In an embodiment, the display apparatus may further include a fixing portion disposed on the moving portion and having an end of the elastic portion fixed to the fixing portion.

In an embodiment, the elastic portion may include a first elastic portion disposed on a first side surface of the case and fixed to the fixing portion and a second elastic portion disposed on a second side surface of the case and facing the first elastic portion, the second side surface being different from the first side surface.

In an embodiment, a portion of the first elastic portion may be disposed on the case, and a portion of the second elastic portion may be disposed below the case.

According to one or more embodiments, a display apparatus may include a case; a moving portion inserted into or withdrawn from the case; a multi-joint structure inserted into or withdrawn from the case in case that the moving portion moves; a display panel disposed on outer surfaces of the case and the multi-joint structure, maintained in a bent state on a side surface of the moving portion, and inserted into or withdrawn from the case in case that the moving portion moves; and an elastic portion disposed on a side surface of the multi-joint structure and having a substantially round cross-sectional shape that is perpendicular to a longitudinal direction.

In an embodiment, a portion of the substantially round cross-sectional shape of the elastic portion may protrude toward the display panel.

In an embodiment, the display apparatus may further include a driver connected to the moving portion and configured to move the moving portion.

In an embodiment, the multi-joint structure may include support members disposed apart from each other and a locking portion disposed on each of the support members and configured to fix the elastic portion.

In an embodiment, the display apparatus may further include a fixing portion disposed on the moving portion, having an end of the elastic portion fixed to the fixing portion, and configured to wind or unwind the elastic portion in case that the moving portion moves.

In an embodiment, the elastic portion may include a first elastic portion partially fixed to an end of the fixing portion and a second elastic portion partially fixed to another end of the fixing portion.

In an embodiment, a direction in which the first elastic portion is wound around the fixing portion may be opposite to a direction in which the second elastic portion is wound around the fixing portion.

In an embodiment, the elastic portion may include a metal or a carbon fiber-reinforced plastic.

In an embodiment, the display apparatus may further include a protective member disposed between the display panel and the multi-joint structure.

Other aspects, features, and advantages than those described above will become apparent from the following drawings, the claims, and the detailed description.

BRIEF DESCRIPTION OF THE DRAWINGS

The above and other aspects, features, and advantages of given embodiments will be more apparent from the following description taken in conjunction with the accompanying drawings, in which.

DETAILED DESCRIPTION OF THE EMBODIMENTS

Figure 1:
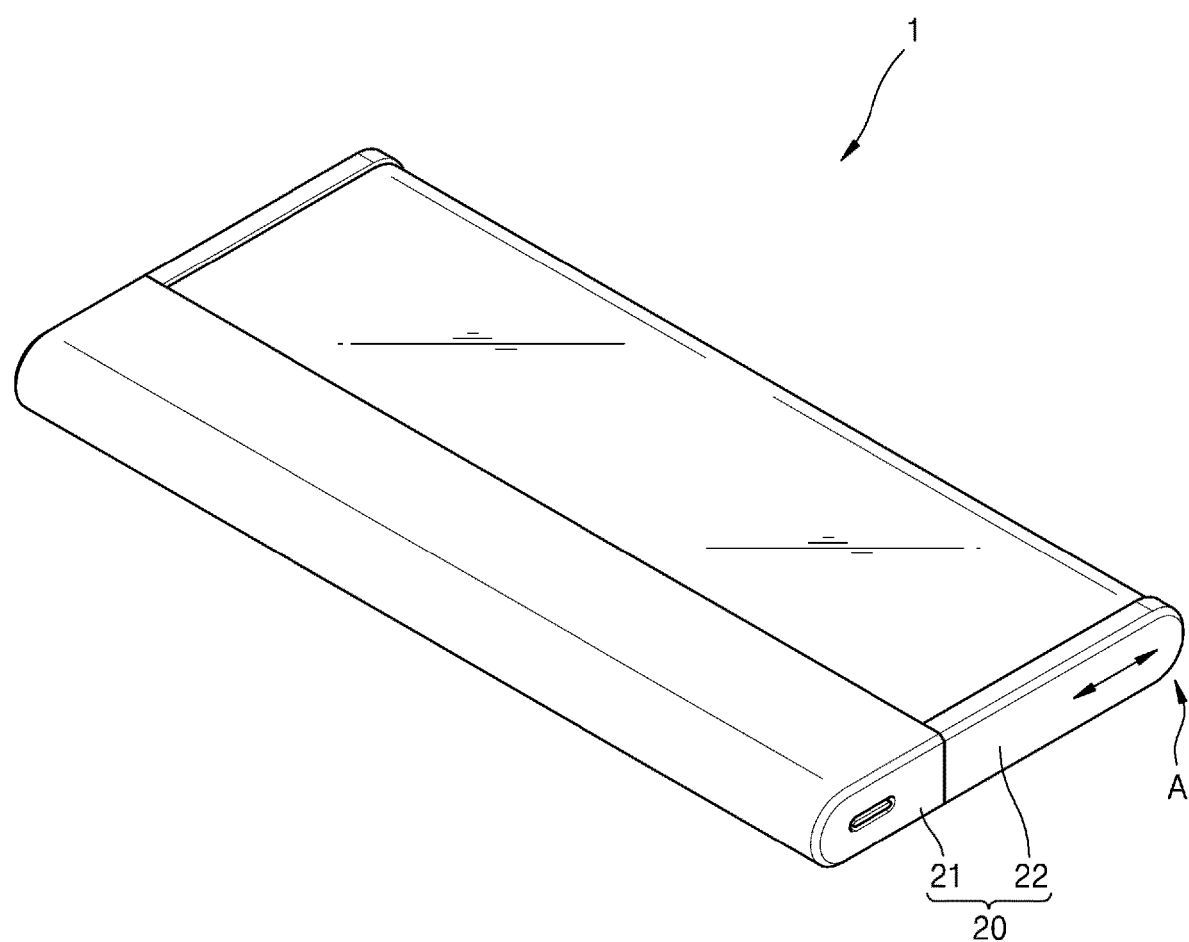
FIG. 1 is a schematic perspective view of a display apparatus according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, the embodiments are described below, by referring to the figures, to explain aspects of the description.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or.

In the specification and the claims, the phrase "at least one of" is intended to include the meaning of "at least one selected from the group of" for the purpose of its meaning and interpretation. For example, "at least one of A and B" may be understood to mean "A, B, or A and B.

As the disclosure allows for various changes and numerous embodiments, embodiments will be illustrated in the drawings and described in detail in the written description. Effects and features of the disclosure and methods of achieving the same will become apparent with reference to embodiments described below in detail with reference to the drawings. However, the disclosure is not limited to the following embodiments, and may be embodied in various forms.

Hereinafter, embodiments of the disclosure will be described in detail with reference to the accompanying drawings. When describing embodiments with reference to the drawings, the same or corresponding elements are denoted by the same reference numerals, and redundant descriptions thereof may be omitted.

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

It will be understood that when an element such as a layer, film, region, area, substrate, plate, or constituent element is referred to as being "on" another element, it can be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

As used herein, the singular forms, "a", "an", and "the" are intended to include the plural forms as well, unless the context clearly indicates otherwise.

Unless explicitly described to the contrary, "comprises", "comprising", "includes", and/or "including", "has", "have", and/or "having", and variations thereof when used in this specification, specify the presence of stated features, integers, steps, operations, elements, components, and/or groups thereof, but do not preclude the presence or addition of one or more other features, integers, steps, operations, elements, components, and/or groups thereof.

In the following embodiments, when a layer, region, or element is referred to as being "on" another layer, region, or element, it can be directly or indirectly on the other layer, region, or element. For example, intervening layers, regions, or elements may be present.

Throughout the specification, "connected" does not only mean when two or more elements are directly connected, but when two or more elements are indirectly connected through other elements, and when they are physically connected or electrically connected.

Sizes of elements in the drawings may be exaggerated or reduced for convenience of description. For example, because sizes and thicknesses of elements in the drawings are arbitrarily illustrated for convenience of description, the disclosure is not limited thereto.

In the following embodiments, the x-axis, the y-axis, and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When an embodiment may be implemented differently, a given process order may be performed differently from the described order. For example, two processes described in succession may be performed substantially simultaneously, or may be performed in an order opposite to the order described.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2A:
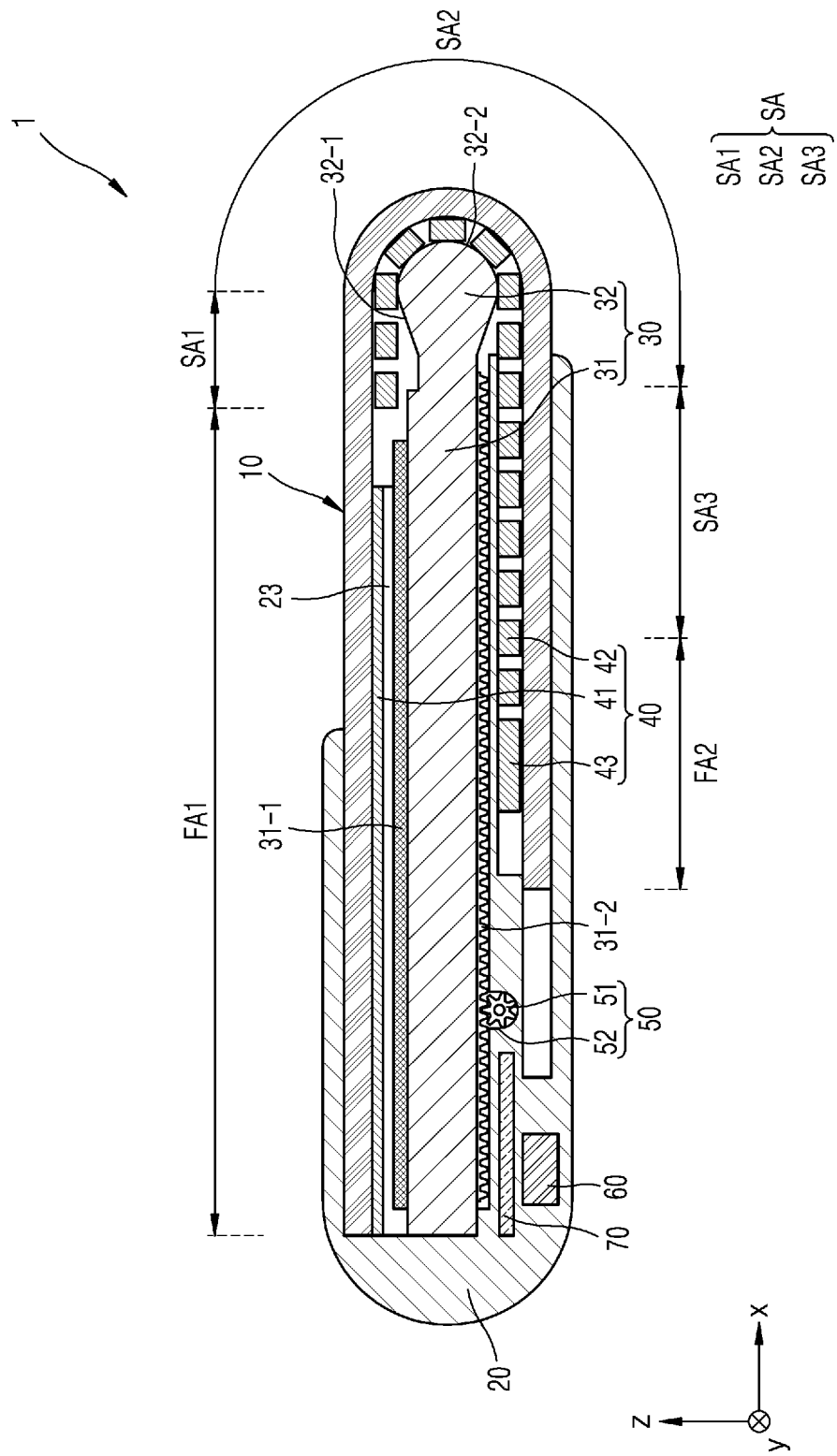
FIG. 2A is a schematic cross-sectional view of the display apparatus shown in FIG. 1.
Figure 2B:
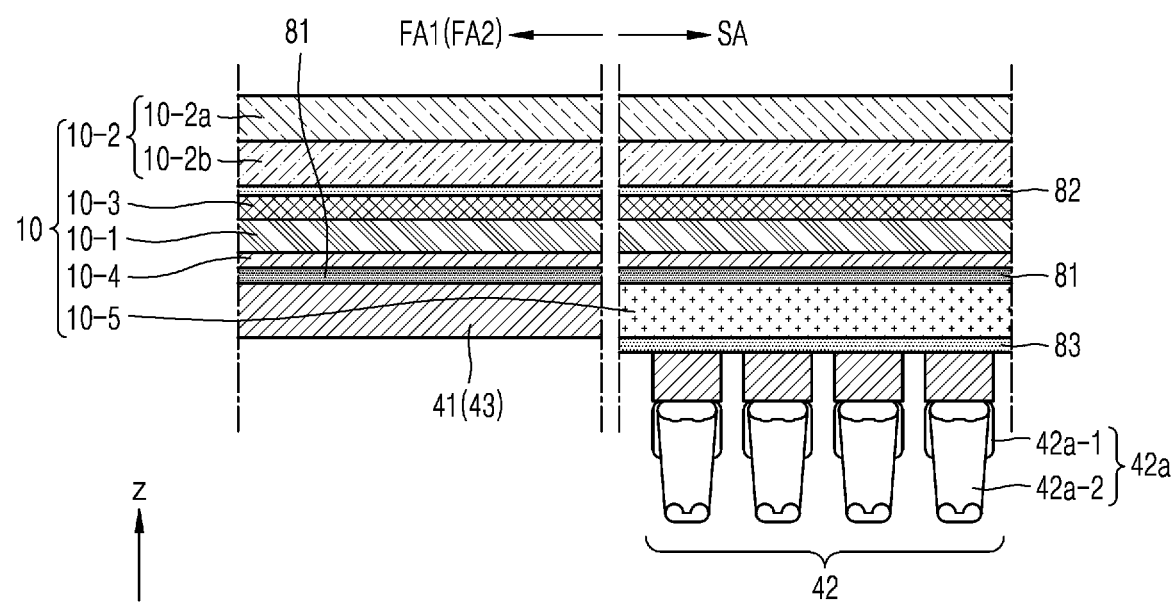
FIG. 2B is a schematic cross-sectional view of a portion of the display apparatus shown in FIG. 1.
Figure 3A:
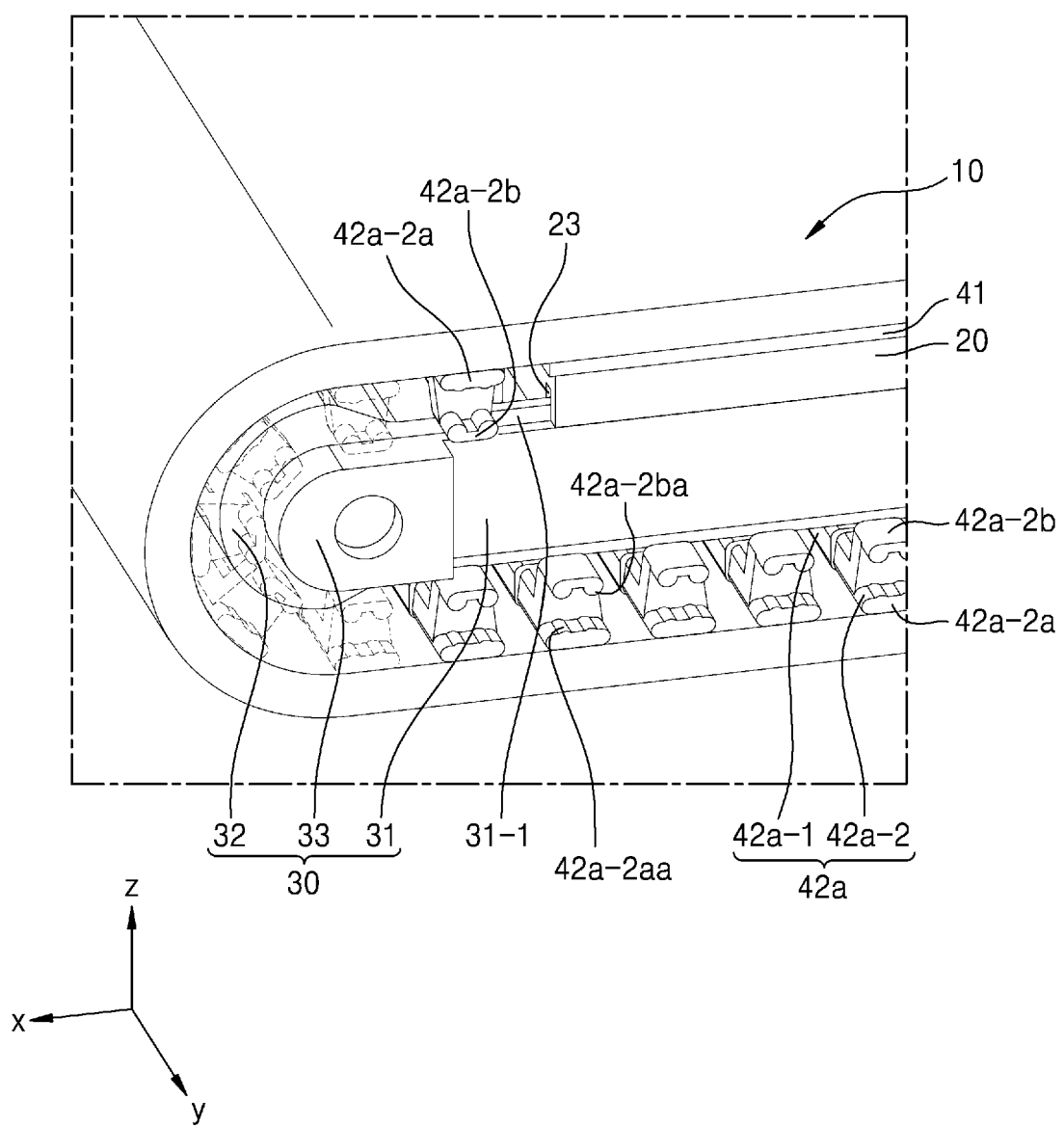
FIG. 3A is a schematic perspective view of a portion of the display apparatus shown in FIG. 1.
Figure 3B:
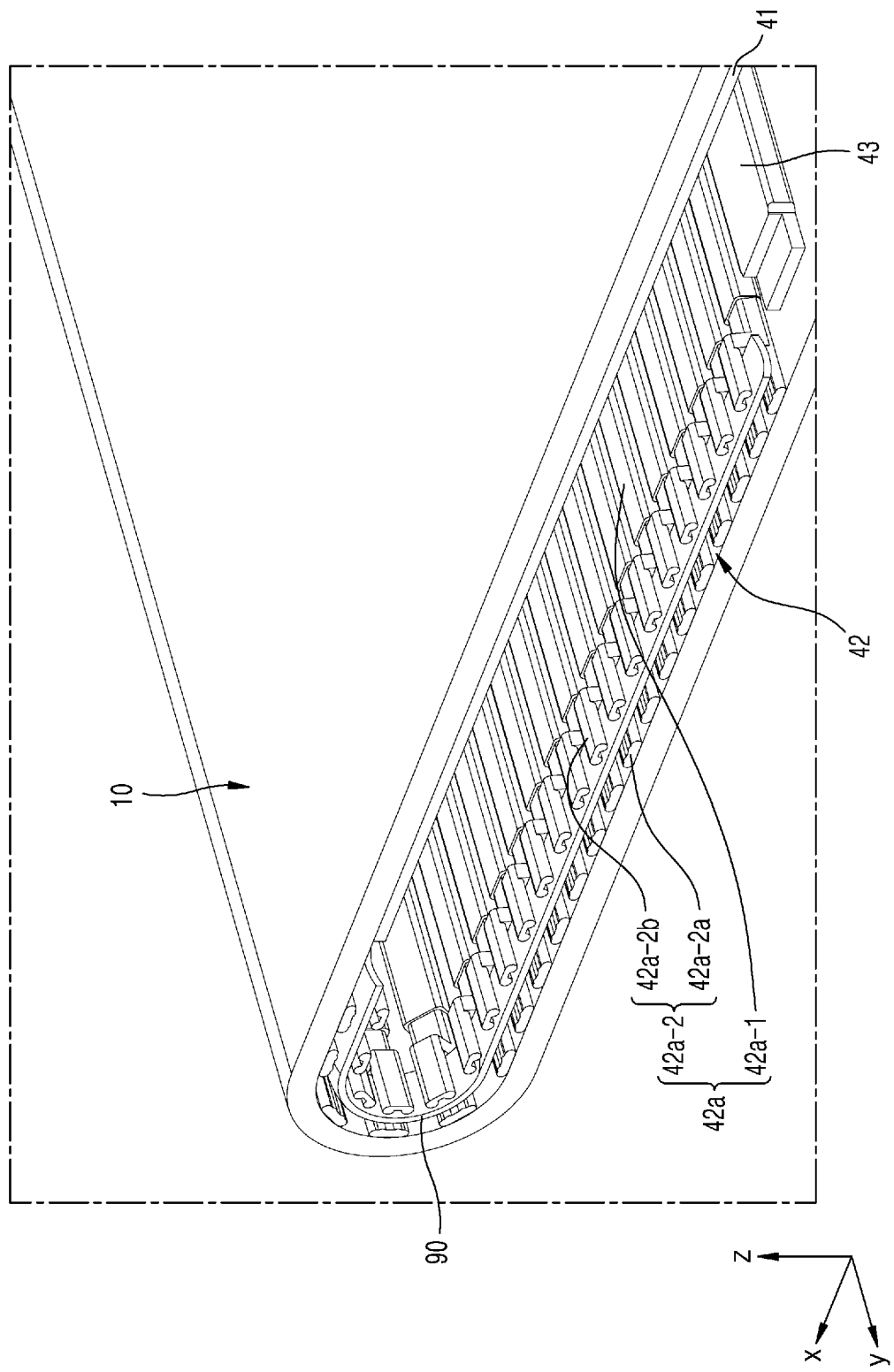
FIG. 3B is a schematic perspective view of a portion of the display apparatus shown in FIG. 1.
Figure 4A:
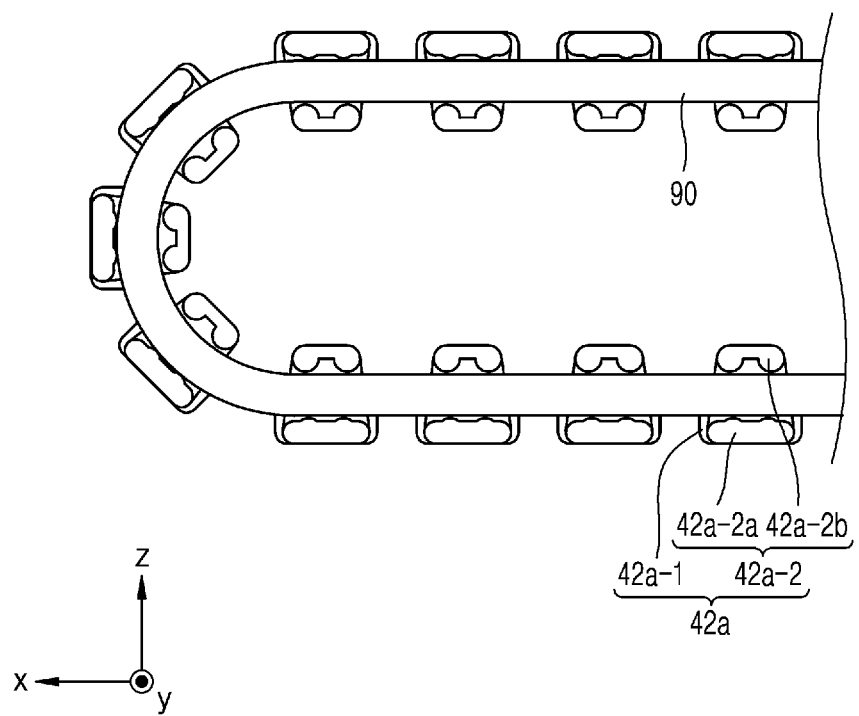
FIG. 4A is a schematic front view of a portion of the display apparatus shown in FIGS. 3A and 3B.
Figure 4B:
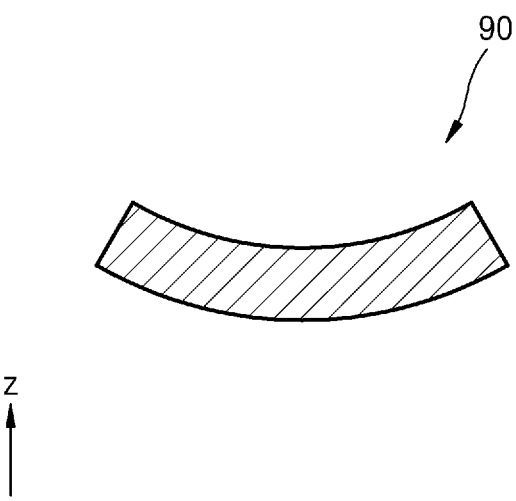
FIG. 4B is a schematic cross-sectional view of an elastic portion shown in FIG. 3B.

FIG. 1 is a schematic perspective view of a display apparatus according to an embodiment. FIG. 2A is a schematic cross-sectional view of the display apparatus shown in FIG. 1. FIG. 2B is a schematic cross-sectional view of a portion of the display apparatus shown in FIG. 1. FIG. 3A is a schematic perspective view of a portion of the display apparatus shown in FIG. 1. FIG. 3B is a schematic perspective view of a portion of the display apparatus shown in FIG. 1. FIG. 4A is a schematic front view of a portion of the display apparatus shown in FIGS. 3A and 3B. FIG. 4B is a schematic cross-sectional view of an elastic portion shown in FIG. 3B. In this regard, FIGS. 3A and 3B are schematic perspective views of the display apparatus 1 in direction A of FIG. 1, and FIG. 4B is a schematic cross-sectional view of the elastic portion 90 arranged (or disposed) in a lower portion of FIG. 4A.

Referring to FIGS. 1 to 4B, a display apparatus 1 may include a case 20, a display panel unit 10, a moving portion 30, a multi-joint structure 40, an elastic portion 90, a driver 50, a controller 60, and a power unit 70. According to one embodiment, the elastic portion 90 may be disposed on a side surface of the multi-joint structure 40 and may be configured to press the multi-joint structure 40 toward a surface of the display panel unit 10 on which an image may be displayed. In a further embodiment, the elastic portion 90 may have a substantially plate shape and may be substantially rounded to protrude toward the display panel unit 10.

The case 20 may have a space arranged therein so that the display panel unit 10 and/or the multi-joint structure 40 may be inserted into or withdrawn from the case 20. The case 20 may include at least one case. In case that cases 20 are provided, the cases 20 may be assembled with each other.

The case 20 may include a first case 21 that has a space arranged therein and accommodates at least a portion of the display panel unit 10, and a second case 22 that is separated from the first case 21 and moves linearly. In this regard, at least a portion of the second case 22 may be arranged inside the first case 21, or the entire second case 22 may be arranged outside the first case 21. The second case 22 may be connected to the moving portion 30 and move together with the moving portion 30 in case that the moving portion 30 moves. The second case 22 may not interfere with the movement of the display panel unit 10 and the multi-joint structure 40 by moving relative to the display panel unit 10 and the multi-joint structure 40. For example, a direction along which the second case 22 moves may correspond to the x-axis direction shown in FIG. 1, an extension direction of the second case 22 may correspond to the y-axis direction shown in FIG. 1, and a thickness direction of elements may correspond to the z-axis direction shown in FIG. 1.

The display panel unit 10 may display an image, and may be partially inserted and fixed inside the case 20. The display panel unit 10 may be bent at one end or an end of the case 20. In this regard, the display panel unit 10 may include a first area FA1 disposed flat on one surface or a surface (for example, a surface on which a user may view an image) of the case 20, a second area SA extending from the first area FA1 and partially bent, and a third area FA2 extending from the second area SA and arranged to face the first area FA1. In the above case, the second area SA may include a second-first area SA1 connected to the first area FA1, a second-second area SA2 connected to the second-first area SA1 and having at least a portion thereof bent along an outer surface of the moving portion 30, the bent portion being variable according to the movement of the moving portion 30, and a second-third area SA3 connected to the second-second area SA2 and withdrawn from the inside of the case 20 or moving inside the case 20 according to the movement of the moving portion 30. The moving portion 30 may be inserted into the case 20 or withdrawn from the case 20. In the above case, at least one area or an area of the second area SA may be disposed on the multi-joint structure 40. Hereinafter, for convenience of description, a case where all areas of the second area SA are disposed on the multi-joint structure 40 is described in detail. According to one embodiment, the multi-joint structure 40 may be inserted into the case 20 or withdrawn from the case 20 in case that the moving portion 30 moves.

The display panel unit 10 may display an image on one surface or a surface thereof. In this regard, the surface of the display panel unit 10 on which an image is displayed may be exposed to the outside. In the display panel unit 10, a portion where an image is displayed may increase or decrease according to the movement of the moving portion 30. Furthermore, the display panel unit 10 may display an image in at least one of the first area FA1, the second area SA, and the third area FA2. According to one embodiment, the portion of the display panel unit 10 which may be disposed on the side surface of the moving portion 30 may be substantially round.

Although not shown in the drawings, in the display panel unit 10, a separate restoring force generator (not shown) may be arranged at an end of the display panel unit 10 that moves linearly. The restoring force generator may include an elastic material arranged between the end of the display panel unit 10 and the case 20 and having both ends thereof connected to the end of the display panel unit 10 and the case 20, respectively. For example, the restoring force generator may include a bar including an elastic material, such as rubber or silicon. In an embodiment, the restoring force generator may include a coil spring. In an embodiment, the restoring force generator may include a wire connected to the end of the display panel unit 10, a pulley around which the wire is wound or unwound, and a torsion spring connected to a rotating shaft of the pulley to provide a restoring force in case that the pulley rotates. The restoring force generator may not only provide a restoring force to the display panel unit 10 in case that the end of the display panel unit 10 returns to the initial state after moving linearly, but may also maintain a constant tension of the display panel unit 10 in case that the display panel unit 10 moves linearly.

Referring to FIG. 2B, the display panel unit 10 may include a display panel 10-1, a cover member 10-2, a signal input layer 10-3, a first protective member 10-4, and a second protective member 10-5. According to one embodiment, the protective member 10-4, 10-5 may be disposed between the display panel 10-1 and the multi-joint structure 40.

The display panel 10-1 may include a flexible substrate, and may be bendable. In this regard, the display panel 10-1 may display an image on the entire surface thereof or only on a portion thereof.

The cover member 10-2 may be disposed on one surface or a surface of the display panel 10-1 on which an image is displayed. In this regard, the cover member 10-2 may include a window layer 10-2a and a window protection layer 10-2b. The window layer 10-2a may include a transparent material, such as glass or acryl. The cover member 10-2 may be fixed by a second adhesive layer 82 disposed on the signal input layer 10-3. In this regard, the second adhesive layer 82 may include a transparent adhesive member, such as an optically clear adhesive (OCA) film, and/or a pressure sensitive adhesive (PSA).

The signal input layer 10-3 may be disposed on the display panel 10-1. In this regard, the signal input layer 10-3 may include touch electrodes, and may be a layer for detecting whether there is a touch of a user. The signal input layer 10-3 may be directly formed on the display panel 10-1. By way of example, the signal input layer 10-3 may be separately formed and coupled to or connected to the display panel 10-1 through an adhesive layer, such as an OCA.

Although not shown in the drawings, an optical functional layer (not shown) may be disposed on the signal input layer 10-3. The optical functional layer may include an anti-reflection layer. The anti-reflection layer may reduce the reflectance of light (external light) incident from the outside toward the display apparatus 1.

In an embodiment, the anti-reflection layer may include a polarizing film. The polarizing film may include a linear polarizing plate and a phase retardation film, such as a quarter-wave ($\lambda/4$) plate. The phase retardation film may be disposed on the signal input layer 10-3, and the linear polarizing plate may be disposed on the phase retardation film.

In an embodiment, the anti-reflection layer may include a filter layer including a black matrix and color filters. The color filters may be arranged considering the color of light emitted from each of pixels of the display apparatus 1. For example, the filter layer may include a red, green, or blue filter.

In an embodiment, the anti-reflection layer may include a destructive interference structure. The destructive interference structure may include a first reflective layer and a second reflective layer disposed on different layers. First reflected light and second reflected light respectively reflected from the first reflective layer and the second reflective layer may destructively interfere, and thus, the reflectance of external light may be reduced.

In case that the display panel unit 10 may include the signal input layer 10-3 and the optical functional layer as described above, the display panel unit 10 may have a form in which the display panel 10-1, the signal input layer 10-3, the optical functional layer, and the cover member 10-2 may be sequentially stacked each other upward.

The first protective member 10-4 may include polyimide. In this regard, the first protective member 10-4 may include an adhesive member. For example, the first protective member 10-4 may have a mixed form of polyimide and an adhesive member. In an embodiment, the first protective member 10-4 may have a form in which an adhesive member and polyimide are stacked each other. For example, a first layer including an adhesive member may be disposed below the display panel 10-1, and a second layer including polyimide may be disposed below the first layer.

A first adhesive layer 81 may be disposed below the first protective member 10-4. In this regard, the first adhesive layer 81 may be the same as or similar to the second adhesive layer 82, and thus, a detailed description thereof is omitted.

The multi-joint structure 40 or the second protective member 10-5 may be disposed below the first protective member 10-4. For example, the first protective member 10-4 and respectively one of a first portion 41 and a third portion 43 of the multi-joint structure 40 to be described below may be disposed below the display panel 10-1 arranged in respectively one of the first area FA1 and the third area FA2. In this regard, the first adhesive layer 81 may be arranged between the first portion 41 and the first protective member 10-4 and between the third portion 43 and the first protective member 10-4. In contrast, the first protective member 10-4 and the second protective member 10-5 may be disposed below the display panel 10-1 arranged in the second area SA. In this regard, the first adhesive layer 81 may be arranged between the first protective member 10-4 and the second protective member 10-5. A second portion 42 of the multi-joint structure 40 may be disposed below the second protective member 10-5. A third adhesive layer 83 may be arranged between the second portion 42 and the second protective member 10-5, and the third adhesive layer 83 may be the same as or similar to the first adhesive layer 81 and the second adhesive layer 82.

The second protective member 10-5 may include at least one of a light-absorbing layer for absorbing light incident from the outside and a cushion layer for absorbing an impact from the outside.

The light-absorbing layer may be disposed below the display panel 10-1. The light-absorbing layer may block light transmission to prevent components disposed below a light-absorbing member, for example, a display circuit board 3 (see FIG. 8), from being viewed from above the display panel 10-1. The light-absorbing layer may include a light-absorbing material, such as a black pigment or a black dye.

The cushion layer may be disposed below the light-absorbing member. The cushion layer may absorb an external impact to prevent the display panel 10-1 from being damaged. The cushion layer may include a single layer or multiple layers. For example, the cushion layer may include polymer resin, such as polyurethane, polycarbonate, polypropylene, or polyethylene, or may include a material having elasticity, such as rubber, a urethane-based material, or a sponge formed by foam-molding an acrylic material.

The moving portion 30 may be arranged inside the case 20 and move linearly. In this regard, the moving portion 30 may include a first moving portion 31 inserted into the case 20, a second moving portion 32 connected to the first moving portion 31 and in contact with at least a portion of the multi-joint structure 40, and a third moving portion 33 protruding from the second moving portion 32. According to one embodiment, a driver 50 may be disposed between the moving portion 30 and the case 20. The driver 50 may be configured to move the moving portion 30.

The first moving portion 31 may move linearly according to an operation of the driver 50 in conjunction with the driver 50. In this regard, the first moving portion 31 may have a plate shape. In the above case, the first moving portion 31 may include a first guide portion 31-1. In this regard, the first guide portion 31-1 may have a protrusion or groove shape. Hereinafter, for convenience of description, a case where the first guide portion 31-1 may include a protrusion is described in detail.

The first guide portion 31-1 may be inserted into a second guide portion 23 arranged in the case 20 or in a portion of the multi-joint structure 40. In this regard, the shape of the second guide portion 23 may be determined according to the shape of the first guide portion 31-1. For example, in case that the first guide portion 31-1 is a protrusion, the second guide portion 23 may have a groove shape. In contrast, in case that the first guide portion 31-1 is a groove, the second guide portion 23 may have a protrusion shape. In an embodiment, in case that one of the first guide portion 31-1 and the second guide portion 23 is a rail, the other one of the first guide portion 31-1 and the second guide portion 23 may include a block that is disposed on the rail and moves along the rail. In this regard, by linearly moving inside the second guide portion 23, the first guide portion 31-1 may guide the movement of the moving portion 30 in case that the moving portion 30 moves linearly. Hereinafter, for convenience of description, a case where the first guide portion 31-1 has a protrusion shape and the second guide portion 23 has a groove shape is described in detail.

The first guide portion 31-1 and the second guide portion 23 may be arranged to correspond to each other. In this regard, one first guide portion 31-1 and one second guide portion 23 may be provided and arranged at a central portion of the planar shape of the moving portion 30. In an embodiment, first guide portions 31-1 and second guide portions 23 may be provided, the first guide portions 31-1 may be arranged apart from each other, and each second guide portion 23 may be arranged to correspond to each first guide portion 31-1. Hereinafter, for convenience of description, a case where the second guide portion 23 is arranged in the case 20 and first guide portions 31-1 and second guide portions 23 are provided is described in detail.

The second moving portion 32 may protrude from the first moving portion 31 toward a side surface of the case 20. In this regard, the second moving portion 32 may include a second-first moving portion 32-1 connected to the first moving portion 31 and a second-second moving portion 32-2 connected to the second-first moving portion 32-1 and in contact with the multi-joint structure 40. The second-first moving portion 32-1 may include an outer surface inclined from a portion where the second-first moving portion 32-1 is connected to the first moving portion 31. For example, as shown in FIG. 2A, the thickness (for example, the thickness measured with respect to a z-axis of FIG. 2A) of a cross section of the second-first moving portion 32-1 may increase from the first moving portion 31 toward the second-second moving portion 32-2. Because the thickness of the cross section of the second-first moving portion 32-1 does not rapidly increase, it is possible to prevent excessive force from being concentrated on a portion of the second-first moving portion 32-1 in case that the first moving portion 31 moves. The second-second moving portion 32-2 may have a substantially round surface. In the above case, the second-second moving portion 32-2 may come into contact with a portion of the multi-joint structure 40, and thus, the multi-joint structure 40 may be smoothly bent. The second-second moving portion 32-2 may have a constant curvature radius. Accordingly, by allowing a bent portion of the display panel unit 10 to have a given curvature, it is possible to prevent excessive force from being applied to a portion of the bent portion of the display panel unit 10.

The third moving portion 33 may protrude from the second moving portion 32 in a direction different from a moving direction of the first moving portion 31. The third moving portion 33 may have a shape similar to that of the second moving portion 32. For example, a portion of the third moving portion 33 may have a straight line shape, and another portion thereof may have a curved shape. In this regard, the straight line-shaped portion of the third moving portion 33 may extend in a longitudinal direction of the first moving portion 31, and the curved portion of the third moving portion 33 may have a shape similar to that of an outer surface of the second-second moving portion 32-2. In the above case, a portion of the multi-joint structure 40 may be seated on the third moving portion 33. Accordingly, the third moving portion 33 may guide the bending shape of the multi-joint structure 40. The third moving portion 33 may be disposed only on a side surface of the second moving portion 32, so that the third moving portion 33 may be in contact with only a portion of the multi-joint structure 40 without contacting the entire multi-joint structure 40.

The multi-joint structure 40 may be connected to the display panel unit 10. In this regard, the multi-joint structure 40 may simultaneously support the display panel unit 10 and assist the unfolding of the display panel unit 10.

The multi-joint structure 40 may include the first portion 41, the second portion 42, and the third portion 43. The first portion 41 and the third portion 43 may have a plate shape, and the first portion 41 and the third portion 43 may be arranged in opposite directions. The second portion 42 may be arranged between the first portion 41 and the third portion 43. In this regard, the second portion 42 may have a variable shape. For example, the second portion 42 may include at least two support portions 42a arranged to be separated from each other. The at least two support portions 42a may be arranged apart from each other, and each support portion 42a may be attached and fixed to the display panel unit 10. The support portion 42a may include a support member 42a-1 and a locking portion 42a-2. The support member 42a-1 may have a bar shape, and may be disposed on one surface or a surface of the display panel unit 10 to support the display panel unit 10. Respective support members 42a-1 of the support portions 42a may be arranged apart from each other, thereby supporting the display panel unit 10 at a portion where the display panel unit 10 is bent. The locking portion 42a-2 may be arranged to be connected to a side surface of each support member 42a-1. In this regard, the locking portion 42a-2 may have a groove formed therein. For example, the locking portion 42a-2 may include a first locking protrusion 42a-2a and a second locking protrusion 42a-2b arranged apart from each other and connected to each other. In this regard, a groove may be formed between the first locking protrusion 42a-2a and the second locking protrusion 42a-2b. The first locking protrusion 42a-2a and the second locking protrusion 42a-2b may be arranged to face each other. In this regard, as shown in FIGS. 3A, 3B, and 4A, the first locking protrusion 42a-2a may be disposed above the second locking protrusion 42a-2b in an upper portion with respect to the drawings, and the first locking protrusion 42a-2a may be disposed below the second locking protrusion 42a-2b in a lower portion with respect to the drawings. For example, the first locking protrusion 42a-2a may be arranged closer to the display panel unit 10 than the second locking protrusion 42a-2b. According to one embodiment, the locking portion 42a-2 may be disposed on each of the support members 42a-1 and having the elastic portion 90 inserted into the locking portion 42a-2. Preferably, the support members 42a-1 may be disposed apart from each other.

At least one of the first locking protrusion 42a-2a and the second locking protrusion 42a-2b may include a protruding portion. Hereinafter, for convenience of description, a case where the first locking protrusion 42a-2a may include a protruding portion is described in detail.

The first locking protrusion 42a-2a may include a first protruding portion 42a-2aa protruding toward the second locking protrusion 42a-2b. In this regard, first protruding portions 42a-2aa may be provided, and the first protruding portions 42a-2aa may be arranged apart from each other. In this regard, each first protruding portion 42a-2aa may be arranged to form a given angle with respect to a longitudinal direction of the elastic portion 90. For example, a longitudinal direction of each first protruding portion 42a-2aa may be perpendicular to the longitudinal direction of the elastic portion 90.

The second locking protrusion 42a-2b may include a second protruding portion 42a-2ba protruding toward the first locking protrusion 42a-2a. In this regard, the second protruding portion 42a-2ba may be arranged to form a given angle (for example, a right angle) with respect to the longitudinal direction of the elastic portion 90. In this regard, the second locking protrusion 42a-2b may support a side surface of the elastic portion 90.

The multi-joint structure 40 may only be in partial contact with the moving portion 30. For example, only some or a number of portions of the multi-joint structure 40 arranged in the second area SA may be in contact with the moving portion 30, and other portions of the multi-joint structure 40 arranged in the first area FA1, another portion of the second area SA, and the third area FA2 may not be in contact with the moving portion 30. Accordingly, the multi-joint structure 40 may have reduced contact with the moving portion 30 in case that the moving portion 30 moves, and thus, the multi-joint structure 40 may not interfere with the movement of the moving portion 30.

The elastic portion 90 may be arranged to be inserted into the locking portion 42a-2. In this regard, the elastic portion 90 may include a bistable spring. One or two elastic portions 90 may be provided. In this regard, in case that two elastic portions 90 are provided, the elastic portions 90 may be arranged on opposite sides. For example, the two elastic portions 90 may be respectively arranged on left and right sides of the display apparatus 1 with respect to FIG. 1.

As shown in FIG. 4B, the elastic portion 90 may have a curved shape on a cross section that is perpendicular to the longitudinal direction of the elastic portion 90. For example, the elastic portion 90 may have a substantially plate shape and may have a substantially round cross-sectional shape on a section that is perpendicular to a longitudinal direction of the elastic portion 90, a portion of the elastic portion 90 having the substantially round cross-sectional shape may protrude toward the display pane 10-1. The elastic portion 90 may be convex upward or downward with respect to FIGS. 3A, 3B, and 4A. In the elastic portion 90 stretched in a straight line or portions of the elastic portion 90 arranged in a straight line, both ends of the elastic portion 90 may be arranged slightly farther from each other than in the initial state in which no force is applied to the elastic portion 90, and thus, both ends of the elastic portion 90 may have a tendency to come close to each other. In this regard, with respect to FIGS. 3A, 3B, and 4A, a portion of the elastic portion 90 arranged in an upper portion may be convex upward, and a portion of the elastic portion 90 arranged in a lower portion may be convex downward. By applying force to the elastic portion 90 arranged in a bent portion of the second area SA so that the elastic portion 90 curls up, the locking portion 42a-2 may be pressed toward the display panel 10-1. Accordingly, the elastic portion 90 may maintain the display panel 10-1 flat on the entire surface of the display panel 10-1. Hereinafter, for convenience of description, the portion of the elastic portion 90 arranged in the upper portion with respect to FIGS. 3A, 3B, and 4A is described in detail.

An upper surface of the elastic portion 90 arranged as described above may be in contact with the first protruding portion 42a-2aa. In this regard, as described above, each first protruding portion 42a-2aa may be in line contact or surface contact with the elastic portion 90 in a direction perpendicular to the longitudinal direction of the elastic portion 90. In the above case, both ends of the elastic portion 90 may be supported by being seated on the second locking protrusion 42a-2b. As described above, both ends of the cross section of the elastic portion 90 may have a tendency to come close to each other. In this regard, the first protruding portion 42a-2aa may be completely in close contact with the upper surface of the elastic portion 90, and due to the above-described behavior of both ends of the cross section of the elastic portion 90, the upper surface of the elastic portion 90 may apply force upward to the first locking protrusion 42a-2a through the first protruding portion 42a-2aa. Accordingly, the support member 42a-1 connected to the first locking protrusion 42a-2a may apply force to the display panel unit 10 to prevent the display panel unit 10 from sagging. Thus, the display panel unit 10 may be maintained in a flat state. By way of example, the elastic portion 90 may press the display panel unit 10 in a direction away from the moving portion 30 at a portion where the display panel unit 10 is bent, thereby preventing wrinkles from occurring at the portion where the display panel unit 10 is bent.

The elastic portion 90 may have a variable thickness. For example, the thicknesses of portions of the elastic portion 90 arranged in the first area FA1 and the third area FA2 may be greater than the thickness of a portion of the elastic portion 90 arranged in the second area SA. The thickness of the portion of the elastic portion 90 arranged in the second area SA may increase toward the portion of the elastic portion 90 arranged in the first area FA1 and/or the portion of the elastic portion 90 arranged in the third area FA2. For example, the thickness of the elastic portion 90 may increase from one point of the elastic portion 90 arranged in the second area SA toward the first area FA1 and/or the third area FA2. In an embodiment, the thickness of the portion of the elastic portion 90 arranged in the second area SA may be constant in each area, and may vary in different areas. For example, the thickness of a portion of the elastic portion 90 arranged in the second-first area SA1 and/or the second-third area SA3 may be greater than the thickness of a portion of the elastic portion 90 arranged in the second-second area SA2.

The driver 50 may be arranged in the case 20, and may move the moving portion 30. In this regard, the driver 50 may have various shapes. For example, the driver 50 may include a cylinder arranged in the case 20 and connected to the moving portion 30. In an embodiment, the driver 50 may include a driving motor 51 and a first gear 52. The moving portion 30 may include a second gear 31-2 connected to the first gear 52. The first gear 52 may be a spur gear, and the second gear 31-2 may be a rack gear. In an embodiment, the driver 50 may include a linear motor arranged between the moving portion 30 and the case 20. In an embodiment, the driver 50 may include a motor arranged in the case 20, and a ball screw that may be connected to the moving portion 30 in case that connected to the motor. The driver 50 is not limited thereto, and may include all structures and apparatuses that are connected to the moving portion 30 to linearly move the moving portion 30. However, hereinafter, for convenience of description, a case where the driver 50 may include the driving motor 51 and the first gear 52 and the moving portion 30 may include the second gear 31-2 is described in detail.

The controller 60 and the power unit 70 may be arranged inside the case 20. In this regard, the controller 60 may be connected to the display panel unit 10 to control the display panel unit 10. The power unit 70 may be connected to the controller 60 and the display panel unit 10 to supply power thereto.

In an operation of the display apparatus 1, in case that an external signal is input or an external force is applied, the driver 50 may operate to linearly move the moving portion 30. The moving portion 30 may move in a first direction (for example, an x-axis direction) according to the operation of the driver 50, and may apply force to a bent portion of the display panel 10-1.

One of the both ends of the display panel 10-1 may be fixed to the case 20, and the other end of the display panel 10-1 may move linearly inside the case 20.

In case that the moving portion 30 moves in the first direction as described above, the position of the second portion 42 in contact with the second moving portion 32 may vary. For example, the second portion 42 arranged in a lower portion with respect to FIG. 3A may come into contact with the second moving portion 32 by rotating clockwise with respect to FIG. 3A. The second portion 42 that has been in contact with the second moving portion 32 may not come into contact with the moving portion 30 any more by moving backward.

Only the locking portion 42a-2 of the second portion 42 in contact with the second moving portion 32 may come into contact with the third moving portion 33. For example, the locking portion 42a-2 arranged to correspond to the bent portion of the display panel 10-1 may come into contact with the third moving portion 33 to maintain the curvature of the bent portion of the display panel 10-1. The third moving portion 33 may maintain a given level of tension of the display panel 10-1 by maintaining a distance between one surface or a surface of the display panel 10-1 and the third moving portion 33.

During the above process, the elastic portion 90 may apply force to the display panel 10-1 as described above. For example, the elastic portion 90 may apply force to the multi-joint structure 40 in the direction of one surface or a surface of the display panel 10-1 on which an image is displayed, so that the multi-joint structure 40 may press the display panel 10-1 outward. Accordingly, an outer surface of the display panel 10-1 may be maintained in a flat state.

Thus, in the display apparatus 1, the area of the display panel 10-1 exposed to the outside may be freely adjusted. In the display apparatus 1, the display panel 10-1 may be maintained flat in case that the display panel 10-1 is unfolded. The display apparatus 1 may display a clear image through the display panel 10-1.

Figure 4C:
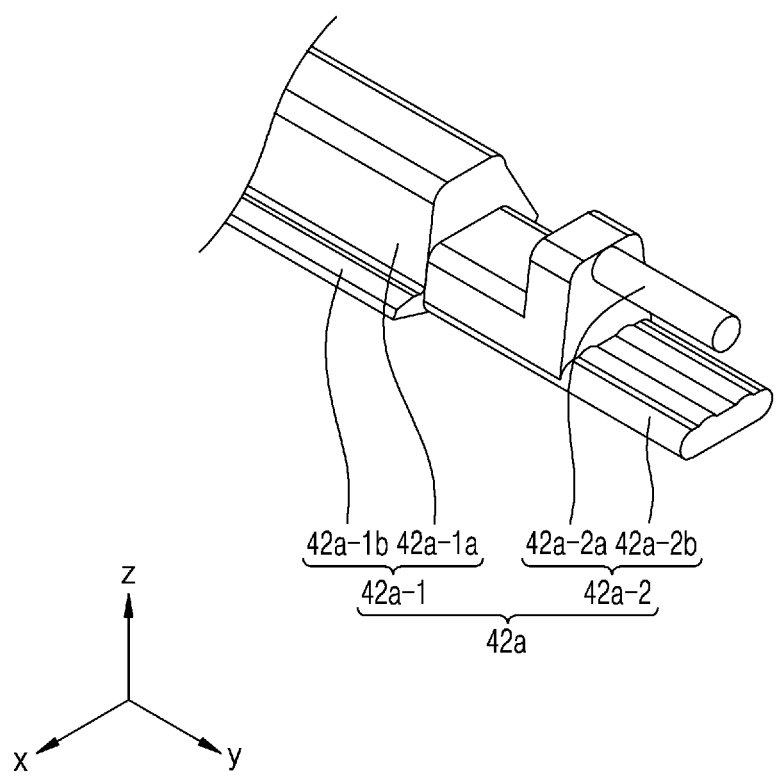
FIG. 4C is a schematic perspective view of a portion of a support portion of a multi-joint structure of a display apparatus according to an embodiment.

FIG. 4C is a schematic perspective view of a portion of a support portion of a multi-joint structure of a display apparatus according to an embodiment. The display apparatus (not shown) may be similar to that described with reference to FIGS. 1 to 4B. Hereinafter, for convenience of description, differences from the display apparatus 1 described above are described in detail.

Referring to FIG. 4C, the support member 42a-1 arranged in the second portion 42 of the multi-joint structure (not shown) may include a support member body portion 42a-1a and a wing portion 42a-1b. In this regard, the wing portion 42a-1b may protrude from the support member body portion 42a-1a toward another support member body portion 42a-1a adjacent thereto. The wing portion 42a-1b may be arranged between the support member body portions 42a-1a adjacent to each other, thereby reducing a space between the support member body portions 42a-1a adjacent to each other. Accordingly, in case that a display panel (not shown) is bent or the display panel moves, hindrance to the bending of the display panel due to foreign substances or other elements of the display apparatus being caught between the support member body portions 42a-1a may be reduced.

In the above case, the wing portion 42a-1b may have a thickness different from that of the support member body portion 42a-1a. Accordingly, even in case that interference occurs between the support members 42a-1 adjacent to each other, the support members 42a-1 may be deformed to a given degree.

Figure 5:
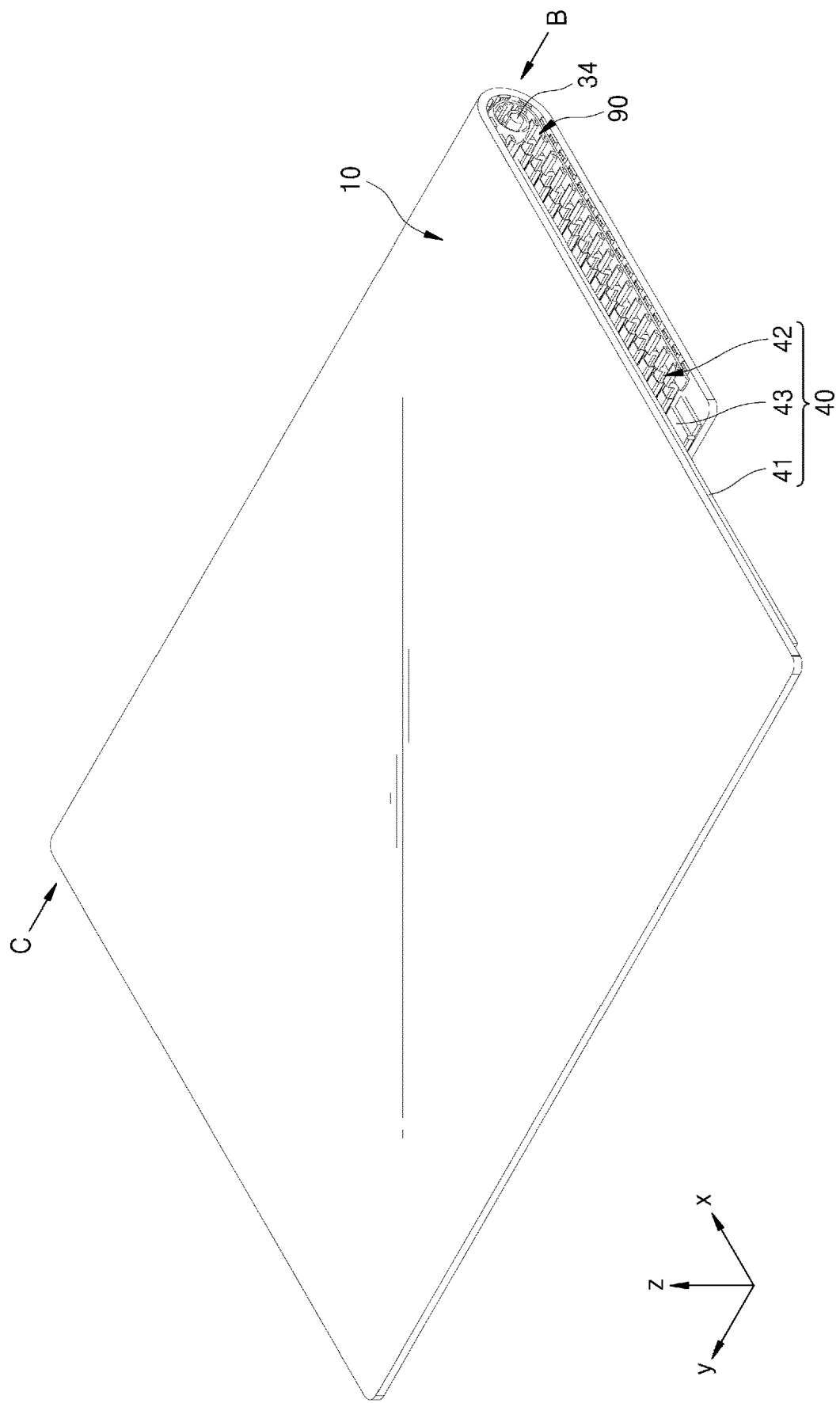
FIG. 5 is a schematic partial perspective view of a portion of a display apparatus according to an embodiment.
Figure 6A:
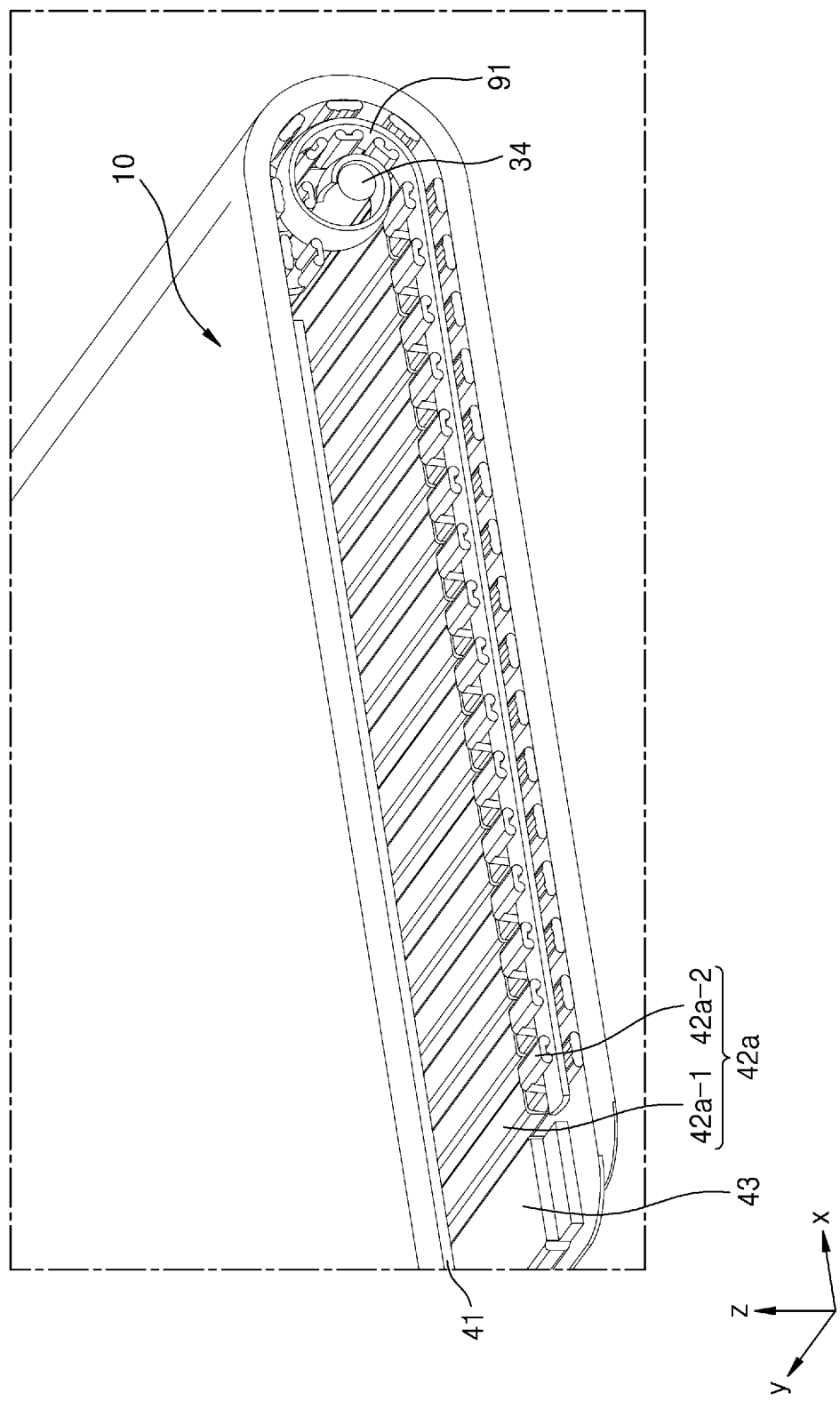
FIG. 6A is a schematic perspective view of a portion of the display apparatus shown in FIG. 5.
Figure 6B:
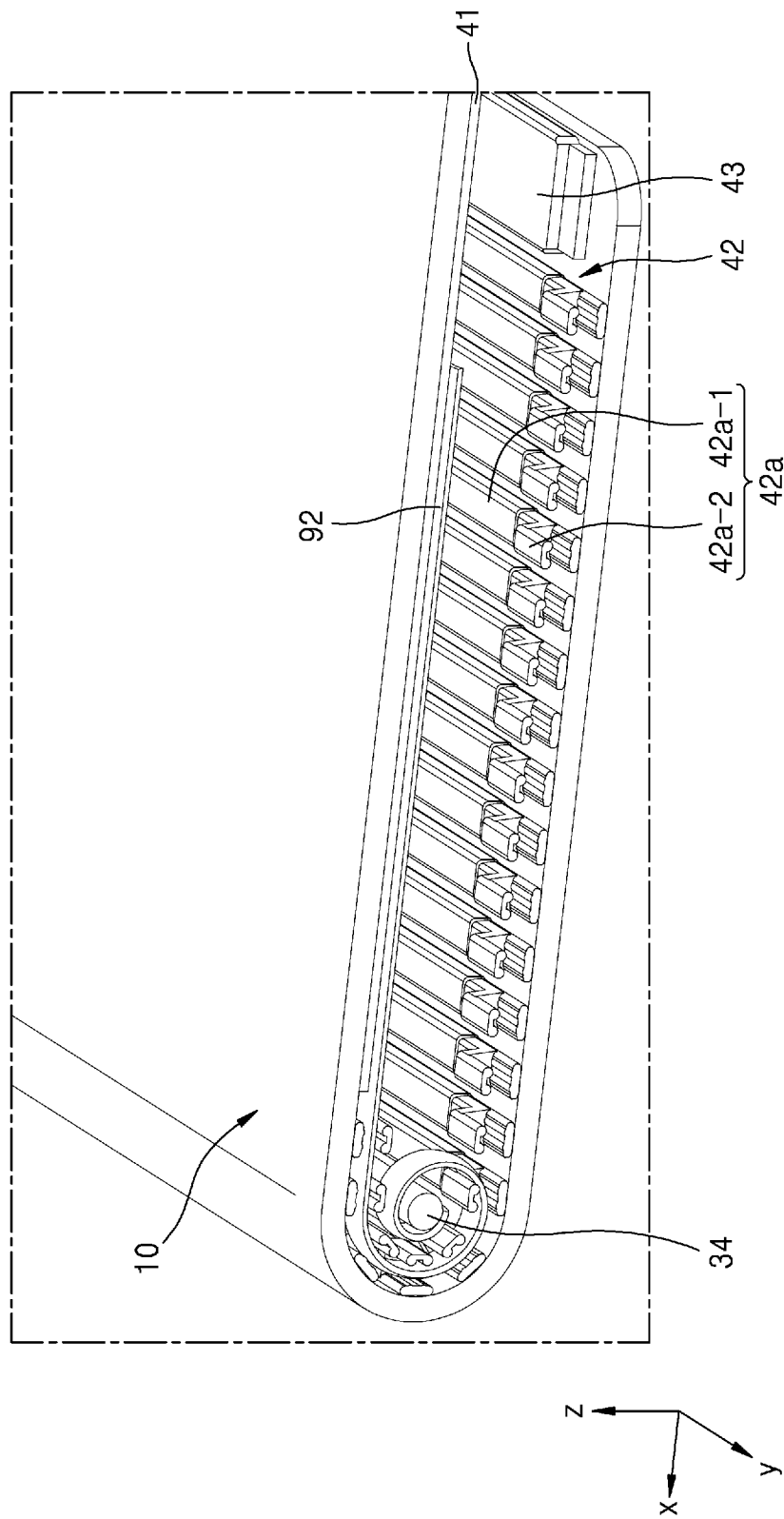
FIG. 6B is a schematic perspective view of a portion of the display apparatus shown in FIG. 5.

FIG. 5 is a schematic partial perspective view of a portion of a display apparatus according to an embodiment. FIG. 6A is a schematic perspective view of a portion of the display apparatus shown in FIG. 5. FIG. 6B is a schematic perspective view of a portion of the display apparatus shown in FIG. 5. In this regard, FIG. 6A is a schematic perspective view of a portion of the display apparatus 1 in direction B of FIG. 5, and FIG. 6B is a schematic perspective view of a portion of the display apparatus 1 in direction C of FIG. 5.

Referring to FIGS. 5 to 6B, the display apparatus 1 may include the case 20, the display panel unit 10, the moving portion 30, the multi-joint structure 40, the elastic portion 90, the driver 50, the controller 60, and the power unit 70. In this regard, detailed descriptions of the case 20, the display panel unit 10, the moving portion 30, the multi-joint structure 40, the driver 50, and the power unit 70 that are the same as or similar to those described above are omitted, and differences therefrom are described in detail.

The elastic portion 90 may include a first elastic portion 91 and a second elastic portion 92. In this regard, the first elastic portion 91 and the second elastic portion 92 may be arranged on opposite sides. For example, the first elastic portion 91 may be arranged on a right side with respect to FIG. 5, and the second elastic portion 92 may be arranged on a left side with respect to FIG. 5.

Referring to FIG. 6A, the first elastic portion 91 may support a lower portion of the display panel unit 10. Referring to FIG. 6B, the second elastic portion 92 may support an upper portion of the display panel unit 10. The first elastic portion 91 may press the display panel unit 10 downward, and the second elastic portion 92 may press the display panel unit 10 upward.

One end or an end of each of the first elastic portion 91 and the second elastic portion 92 may be fixed to the moving portion 30. In this regard, a fixing portion 34 may be disposed on the moving portion 30. For example, the fixing portion 34 may protrude from the moving portion 30 in a direction different from a moving direction of the moving portion 30.

According to one embodiment, the fixing portion 34 may be disposed on the moving portion 30 which may have an end of the elastic portion 90 fixed to the fixing portion 34. Preferably the elastic portion 90 comprises the first elastic portion 91 may be disposed on a first side surface of the case 20 and may be fixed to the fixing portion 34. The second elastic portion 92 may be disposed on a second side surface of the case 20 and may face the first elastic portion 91. The second side surface may be different from the first side surface. In a preferred embodiment, a portion of the first elastic portion 91 may be disposed on the case 20, and a portion of the second elastic portion 92 may be disposed below the case 20.

The fixing portion 34 may protrude from the outer surface of the moving portion 30 to fix the first elastic portion 91 and the second elastic portion 92. In this regard, one end or an end of the first elastic portion 91 may be fixed to the fixing portion 34, and the first elastic portion 91 may be wound along an outer surface of the fixing portion 34 and extend in one direction or in a direction. One end or an end of the second elastic portion 92 may be fixed to the fixing portion 34, and the second elastic portion 92 may be wound along the outer surface of the fixing portion 34 and extend in one direction or in a direction. A direction in which the first elastic portion 91 is wound around the fixing portion 34 may be opposite to a direction in which the second elastic portion 92 is wound around the fixing portion 34. The first elastic portion 91 and the second elastic portion 92 may each partially fixed to different ends of the fixing portion 34. Each of the first elastic portion 91 and the second elastic portion 92 may be inserted into the locking portion 42a-2. In this regard, the cross-sectional shape of each of the first elastic portion 91 and the second elastic portion 92 on a section that is perpendicular to a longitudinal direction thereof may be the same as or similar to that shown in FIG. 4B.

According to one embodiment of the display apparatus 1 according to the present invention, an elastic portion 90 may be disposed on a side surface of the multi-joint structure 40 which may have a substantially round cross-sectional shape that may be perpendicular to a longitudinal direction. In a preferred embodiment, a portion of the elastic portion 90 having the substantially round cross-sectional shape may protrude toward the display panel 10-1. In one embodiment, a driver 50 may be connected to the moving portion 30 and may be configured to move the moving portion 30. The display apparatus 1 may further comprise a fixing portion 34 disposed on the moving portion 30, which may have an end of the elastic portion 90 fixed to the fixing portion 34, and may be configured to wind or unwind the elastic portion 90 in case that the moving portion 30 moves.

Figure 7:
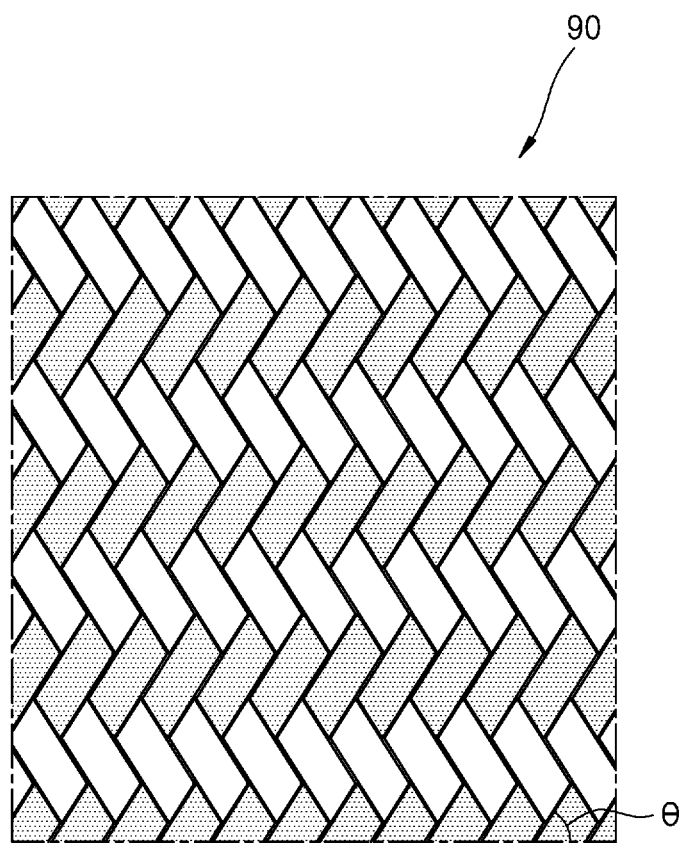
FIG. 7 is a schematic plan view of a portion of an elastic portion shown in FIGS. 6A and 6B.

FIG. 7 is a schematic plan view of a portion of an elastic portion of the display apparatus shown in FIG. 1 or 5.

Referring to FIG. 7, the elastic portion 90 of the display apparatus 1 may include various materials. For example, the elastic portion 90 may include stainless steel (SUS). In an embodiment, the elastic portion 90 may include carbon fiber-reinforced plastic (CFRP). Hereinafter, for convenience of description, a case where the elastic portion 90 may include CFRP is described in detail.

The elastic portion 90 may have a woven form of carbon fibers. In this regard, an angle θ at which the carbon fibers are arranged with respect to the longitudinal direction of the elastic portion 90 may form an acute angle. The angle θ at which the carbon fibers of the elastic portion 90 are arranged may be different in portions of the elastic portion 90. For example, the angle θ of carbon fibers of a portion of the elastic portion 90 arranged in the second area SA may be greater than the angle θ of carbon fibers of portions of the elastic portion 90 arranged in the first area FA1 and the third area FA2. In case that the angle θ formed by the carbon fibers with respect to the longitudinal direction of the elastic portion 90 is large, the elastic portion 90 may have a smaller curvature radius than in case that the angle θ formed by the carbon fibers with respect to the longitudinal direction of the elastic portion 90 is small. Accordingly, the portion of the elastic portion 90 arranged in the second area SA may have a greater force to curl up than other portions of the elastic portion 90, and due to this force to curl up, the display panel 10-1 may be pressed outward through the locking portion 42a-2. Because the elastic portion 90 is formed to have a substantially round cross section as shown in FIG. 4B, due to the force of side surfaces of the elastic portion 90, which extend in the longitudinal direction of the elastic portion 90 in the first area FA1, a portion of the second area SA, and the third area FA2, to move away from each other, the locking portion 42a-2 may be pressed toward the display panel 10-1. Accordingly, the elastic portion 90 may apply force to the display panel 10-1 toward the outside of the display panel 10-1 on the entire surface of the display panel 10-1, so that one surface or a surface of the display panel 10-1 on which an image is displayed may be kept flat.

In an embodiment, the thickness of the cross section of the elastic portion 90 may be constant, or may not be constant and may vary, as described above. In this regard, a case where the thickness of the cross section of the elastic portion 90 is variable may be the same as or similar to that described above, and thus, a detailed description thereof is omitted.

Figure 8:
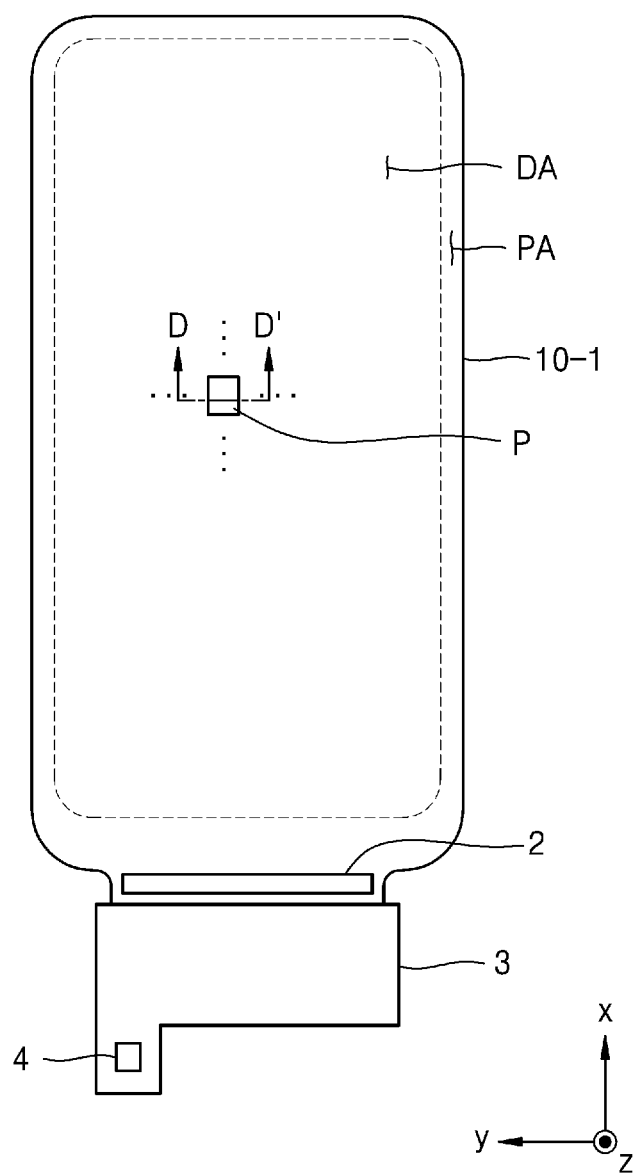
FIG. 8 is a schematic plan view of a display panel shown in FIG. 1 or 5.
Figure 9:
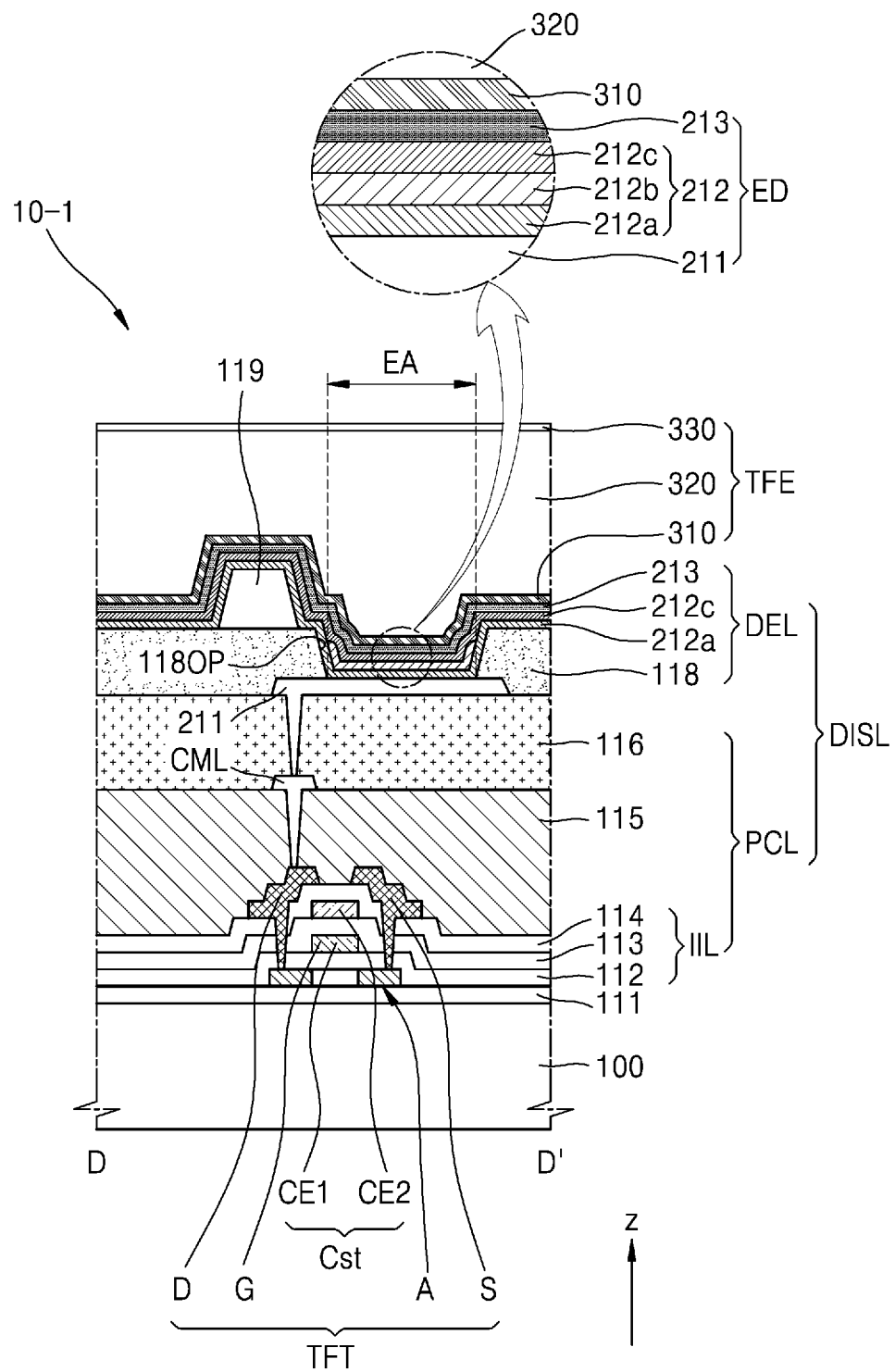
FIG. 9 is a schematic cross-sectional view of the display panel shown in FIG. 8.

FIG. 8 is a schematic plan view of a display panel shown in FIG. 1 or 5. FIG. 9 is a schematic cross-sectional view of the display panel shown in FIG. 8. In this regard, FIG. 9 is a schematic cross-sectional view of a pixel P taken along line D-D' of FIG. 8.

Referring to FIGS. 8 and 9, the display apparatus 1 may further include a display circuit board 3, a display driver 2, and a touch sensor driver 4. The display panel 10-1 may be a light-emitting display panel including a light-emitting element. For example, the display panel 10-1 may be an organic light-emitting display panel using an organic light-emitting diode (LED) including an organic emission layer, a micro LED display panel using a micro LED, a quantum dot light-emitting display panel using a quantum light-emitting element including a quantum dot emission layer, or an inorganic light-emitting display panel using an inorganic light-emitting element including an inorganic semiconductor.

The display panel 10-1 may be a transparent display panel that is implemented to be transparent, so that an object or a background on a lower surface of the display panel 10-1 may be viewed from an upper surface of the display panel 10-1. By way of example, the display panel 10-1 may be a reflective display panel that may reflect an object or a background on the upper surface of the display panel 10-1.

The display panel 10-1 may include a display area DA that implements an image and a peripheral area PA arranged to surround or be adjacent to the display area DA. A separate driving circuit, a pad, etc. may be arranged in the peripheral area PA.

In an embodiment, the peripheral area PA may include a pad area (not shown). The pad area may protrude from the peripheral area PA on one side or a side of the display panel 10-1 in a direction opposite to the x-axis direction. The display driver 2 may be arranged in the pad area, and the display circuit board 3 may be connected to the pad area.

In an embodiment, the display panel 10-1 may include a bending area (not shown) that is arranged between the pad area and the display area DA and is bent. The display panel 10-1 may be bent in the bending area, and the pad area may be disposed on a lower surface of a panel protecting member. The pad area may overlap the display area DA in a thickness direction (a z-axis direction) of the display panel 10-1. In this regard, the pad area may be fixed to the panel protecting member through a panel adhesive member (not shown). The panel adhesive member may be a PSA.

In an embodiment, the peripheral area PA may not include the bending area. A flexible film may be bent, or the display circuit board 3 may be bent. In this regard, the panel adhesive member may be arranged in a manner same as or similar to that described above.

In an embodiment, both the display panel 10-1 and the display circuit board 3 may not be bent.

The display area DA may include pixels P that are display elements, and an image may be displayed through the pixels P. Each of the pixels P may include sub-pixels. For example, each of the pixels P may include a red sub-pixel, a green sub-pixel, and a blue sub-pixel. By way of example, each of the pixels P may include a red sub-pixel, a green sub-pixel, a blue sub-pixel, and a white sub-pixel.

The display circuit board 3 may be attached to an edge of one side or a side of the display panel 10-1.

The display driver 2 may be arranged in various portions of the display apparatus 1. For example, the display driver 2 may be disposed on a substrate 100 of the display panel 10-1. In an embodiment, the display driver 2 may be disposed on a flexible film. In an embodiment, the display driver 2 may be disposed on the display circuit board 3. Hereinafter, for convenience of description, a case where the display driver 2 is disposed on the substrate 100 is described in detail.

The display driver 2 may receive control signals and power voltages, and may generate and output signals and voltages for driving the display panel 10-1. The display driver 2 may be formed as an integrated circuit (IC).

The display circuit board 3 may be attached to the display panel 10-1. In this regard, the display circuit board 3 and the display panel 10-1 may be connected to each other in various ways. In an embodiment, the display circuit board 3 and the display panel 10-1 may be attached to each other by using a flexible film. The flexible film may be connected to the display panel 10-1 and the display circuit board 3 through an anisotropic conductive film. The display circuit board 3 may be a flexible printed circuit board (FPCB) that is bendable or a composite printed circuit board including both a rigid printed circuit board (RPCB), which is hard and is not readily bendable, and an FPCB.

In an embodiment, one side or a side of the display circuit board 3 may be directly attached to an edge of one side or a side of the display panel 10-1 by using an anisotropic conductive film. Hereinafter, for convenience of description, a case where the display circuit board 3 and the display panel 10-1 are connected to each other through an anisotropic conductive film is described in detail.

The touch sensor driver 4 may be disposed on the display circuit board 3. The touch sensor driver 4 may be formed as an IC. The touch sensor driver 4 may be attached on the display circuit board 3. The touch sensor driver 4 may be electrically connected to touch electrodes of a touch screen layer of the display panel 10-1 through the display circuit board 3.

A touch screen layer may be disposed on a thin-film encapsulation layer TFE of the display panel 10-1. In this regard, the touch screen layer may sense a touch input of a user by using at least one of various touch methods, such as a resistive method and a capacitive method. For example, in case that the touch screen layer of the display panel 10-1 senses a touch input of a user by using the capacitive method, the touch sensor driver 4 may determine whether there is a touch of the user by applying driving signals to driving electrodes among the touch electrodes and sensing voltages charged in mutual capacitances between the driving electrodes and sensing electrodes through the sensing electrodes among the touch electrodes. The touch of the user may include a contact touch and a proximity touch. The contact touch refers to direct contact of a user's finger or an object, such as a pen, with a cover member 10-2 disposed on the touch screen layer. The proximity touch indicates that a user's finger or an object, such as a pen, is positioned closely apart from the cover member 10-2, for example, hovering. The touch sensor driver 4 may transmit sensor data to a main processor according to sensed voltages, and the main processor may analyze the sensor data to calculate touch coordinates where a touch input has occurred.

A power supplier for supplying driving voltages for driving pixels P of the display panel 10-1, a scan driver, and the display driver 2 may be additionally disposed on the display circuit board 3. By way of example, the power supplier may be integrated with the display driver 2, and the display driver 2 and the power supplier may be formed as one IC.

The display panel 10-1 may include the substrate 100 and a display layer DISL.

The display layer DISL may be disposed on the substrate 100. The display layer DISL may include pixels, and may be a layer displaying an image. The display layer DISL may include a circuit layer including thin-film transistors, a display element layer on which display elements are disposed, and a sealing member for sealing the display element layer.

The display layer DISL may be divided into the display area DA and the peripheral area PA. The display area DA may be an area in which pixels are arranged to display an image. The peripheral area PA may be an area that is arranged outside the display area DA and does not display an image. The peripheral area PA may be arranged to surround or be adjacent to the display area DA. The peripheral area PA may be an area from the outside of the display area DA to an edge of the display panel 10-1. In addition to pixels, pixel circuits driving pixels, scan lines, data lines, and power lines connected to the pixel circuits, etc. may be arranged in the display area DA. A scan driver for applying scan signals to the scan lines, fan-out lines connecting the data lines to the display driver 2, etc. may be arranged in the peripheral area PA.

A touch screen layer may be disposed on the display layer DISL. The touch screen layer may include touch electrodes, and may sense whether there is a touch of a user. The touch screen layer may be directly formed on a sealing member of the display layer DISL. By way of example, the touch screen layer may be separately formed and coupled to or connected to the sealing member of the display layer DISL through an adhesive layer, such as an OCA.

The display panel 10-1 may include the substrate 100, a buffer layer 111, the display layer DISL, and the thin-film encapsulation layer TFE. The display layer DISL may include a pixel circuit layer PCL and a display element layer DEL.

The substrate 100 may include polymer resin, such as polyethersulfone, polyarylate, polyetherimide, polyethylene naphthalate, polyethylene terephthalate, polyphenylene sulfide, polyimide, polycarbonate, cellulose triacetate, or cellulose acetate propionate. The substrate 100 including the polymer resin may be flexible, rollable, or bendable. The substrate 100 may have a multi-layer structure including a base layer including the above-described polymer resin and a barrier layer (not shown).

The buffer layer 111 may include an inorganic insulating material, such as silicon nitride, silicon oxynitride, and silicon oxide, and may be a single layer or multi-layer including the above-described inorganic insulating material.

The pixel circuit layer PCL may be disposed on the buffer layer 111. The pixel circuit layer PCL may include a thin-film transistor TFT, which is included in a pixel circuit, and an inorganic insulating layer IIL, a first planarization layer 115, and a second planarization layer 116, which are disposed below and/or on components of the thin-film transistor TFT. The inorganic insulating layer IIL may include a first gate insulating layer 112, a second gate insulating layer 113, and an interlayer insulating layer 114.

The thin-film transistor TFT may include a semiconductor layer A, and the semiconductor layer A may include polysilicon. By way of example, the semiconductor layer A may include amorphous silicon, an oxide semiconductor, an organic semiconductor, etc. The semiconductor layer A may include a channel area and a drain area and a source area that are respectively arranged on both sides of the channel area. A gate electrode G may overlap the channel area.

The gate electrode G may include a low-resistance metal material. The gate electrode G may include a conductive material including molybdenum (Mo), aluminum (Al), copper (Cu), titanium (Ti), etc., and may be formed as a multi-layer or single layer including the above-described material.

The first gate insulating layer 112 between the semiconductor layer A and the gate electrode G may include an inorganic insulating material, such as silicon oxide (e.g., $SiO_2$), silicon nitride ($SiN_x$), silicon oxynitride (SiON), aluminum oxide (e.g., $Al_2O_3$), titanium oxide (e.g., $TiO_2$), tantalum oxide (e.g., $Ta_2O_5$), hafnium oxide (e.g., $HfO_2$), or zinc oxide ($ZnO_x$). In this regard, zinc oxide ($ZnO_x$) may be zinc oxide (ZnO) and/or zinc peroxide ($ZnO_2$).

The second gate insulating layer 113 may cover the gate electrode G. The second gate insulating layer 113 may include an inorganic insulating material, such as $SiO_2$, $SiN_x$, SiON, $Al_2O_3$, $TiO_2$, $Ta_2O_5$, $HfO_2$, or $ZnO_x$, like the first gate insulating layer 112. In this regard, $ZnO_x$ may be ZnO and/or $ZnO_2$.

An upper electrode CE2 of a storage capacitor Cst may be disposed on the second gate insulating layer 113. The upper electrode CE2 may overlap the gate electrode G thereunder. In this regard, the gate electrode G and the upper electrode CE2 overlapping each other with the second gate insulating layer 113 therebetween may constitute the storage capacitor Cst of a pixel circuit. For example, the gate electrode G may function as a lower electrode CE1 of the storage capacitor Cst. As such, the storage capacitor Cst and the thin-film transistor TFT may be formed to overlap each other. In an embodiment, the storage capacitor Cst may be formed not to overlap the thin-film transistor TFT.

The upper electrode CE2 may include Al, platinum (Pt), palladium (Pd), silver (Ag), magnesium (Mg), gold (Au), nickel (Ni), neodymium (Nd), iridium (Ir), chromium (Cr), calcium (Ca), Mo, Ti, tungsten (W), and/or Cu, and may be a single layer or multi-layer including the above-described material.

The interlayer insulating layer 114 may cover the upper electrode CE2. The interlayer insulating layer 114 may include $SiO_2$, $SiN_x$, SiON, $Al_2O_3$, $TiO_2$, $Ta_2O_5$, $HfO_2$, or $ZnO_x$. In this regard, $ZnO_x$ may be ZnO and/or $ZnO_2$. The interlayer insulating layer 114 may be a single layer or multi-layer including the above-described inorganic insulating material.

A drain electrode D and a source electrode S may each be positioned on the interlayer insulating layer 114. The drain electrode D and the source electrode S may include a material having high conductivity. The drain electrode D and the source electrode S may include a conductive material including Mo, Al, Cu, Ti, etc., and may be formed as a multi-layer or a single layer including the above-described material. In an embodiment, the drain electrode D and the source electrode S may have a multi-layer structure of Ti/Al/Ti.

The first planarization layer 115 may cover the drain electrode D and the source electrode S. The first planarization layer 115 may include an organic insulating layer. The first planarization layer 115 may include an organic insulating material, such as at least one of a general-purpose polymer such as polymethylmethacrylate (PMMA) or polystyrene (PS), a polymer derivative having a phenolic group, an acrylic polymer, an imide-based polymer, an aryl ether-based polymer, an amide-based polymer, a fluorine-based polymer, a p-xylene-based polymer, a vinyl alcohol-based polymer, and a blend thereof.

A connection electrode CML may be disposed on the first planarization layer 115. In this regard, the connection electrode CML may be connected to the drain electrode D or the source electrode S through the contact hole of the first planarization layer 115. The connection electrode CML may include a material having high conductivity. The connection electrode CML may include a conductive material including Mo, Al, Cu, Ti, etc., and may be formed as a single-layer or multi-layer including the above-described material. In an embodiment, the connection electrode CML may have a multi-layer structure of Ti/Al/Ti.

The second planarization layer 116 may cover the connection electrode CML. The second planarization layer 116 may include an organic insulating layer. The second planarization layer 116 may include an organic insulating material, such as at least one of a general-purpose polymer such as PMMA or PS, a polymer derivative having a phenolic group, an acrylic polymer, an imide-based polymer, an aryl ether-based polymer, an amide-based polymer, a fluorine-based polymer, a p-xylene-based polymer, a vinyl alcohol-based polymer, and a blend thereof.

The display element layer DEL may be disposed on the pixel circuit layer PCL. The display element layer DEL may include a display element ED. The display element ED may be an organic LED (OLED). A pixel electrode 211 of the display element ED may be electrically connected to the connection electrode CML through a contact hole of the second planarization layer 116.

The pixel electrode 211 may include a conductive oxide, such as indium tin oxide (ITO), indium zinc oxide (IZO), zinc oxide (ZnO), indium oxide (e.g., $In_2O_3$), indium gallium oxide, or aluminum zinc oxide (AZO). In an embodiment, the pixel electrode 211 may include a reflective layer including Ag, Mg, Al, Pt, Pd, Au, Ni, Nd, Ir, Cr, or a compound thereof. In an embodiment, the pixel electrode 211 may further include a layer including ITO, IZO, ZnO, or $In_2O_3$ on/below the above-described reflective layer.

The pixel-defining layer 118 having an opening 118OP exposing a central portion of the pixel electrode 211 may be disposed on the pixel electrode 211. The pixel-defining layer 118 may include an organic insulating material and/or an inorganic insulating material. The opening 118OP may define an emission area of light emitted from the display element ED (hereinafter, referred to as an emission area EA). For example, the width of the opening 118OP may correspond to the width of the emission area EA of the display element ED.

A spacer 119 may be disposed on the pixel-defining layer 118. The spacer 119 may prevent damage to the substrate 100 in a method of manufacturing a display apparatus. A mask sheet may be used in case that manufacturing a display apparatus. In case that the mask sheet enters the opening 118OP of the pixel-defining layer 118 or is brought into close contact with the pixel-defining layer 118 to deposit a deposition material on the substrate 100, a defect in which a portion of the substrate 100 is damaged or broken by the mask sheet may be prevented.

The spacer 119 may include an organic insulating material, such as polyimide. By way of example, the spacer 119 may include an inorganic insulating material, such as silicon nitride or silicon oxide, or may include an organic insulating material and an inorganic insulating material.

In an embodiment, the spacer 119 may include a material different from that of the pixel-defining layer 118. By way of example, in an embodiment, the spacer 119 may include the same material (or a similar material) as that of the pixel-defining layer 118. The pixel-defining layer 118 and the spacer 119 may be formed together in a mask process using a halftone mask, etc.

An intermediate layer 212 may be disposed on the pixel-defining layer 118. The intermediate layer 212 may include an emission layer 212b arranged in the opening 118OP of the pixel-defining layer 118. The emission layer 212b may include a polymer or low-molecular weight organic material emitting light of a given color.

A first functional layer 212a and a second functional layer 212c may be disposed below and on the emission layer 212b, respectively. The first functional layer 212a may include, for example, a hole transport layer (HTL), and/or a hole injection layer (HIL). The second functional layer 212c is a component disposed on the emission layer 212b and is optional. The second functional layer 212c may include an electron transport layer (ETL) and/or an electron injection layer (EIL). The first functional layer 212a and/or the second functional layer 212c may be a common layer formed to entirely cover the substrate 100, like an opposite electrode 213 to be described below.

The opposite electrode 213 may include a conductive material having a low work function. For example, the opposite electrode 213 may include a (semi)transparent layer including Ag, Mg, Al, Pt, Pd, Au, Ni, Nd, Ir, Cr, lithium (Li), Ca, or an alloy thereof. By way of example, the opposite electrode 213 may further include a layer including ITO, IZO, ZnO, or $In_2O_3$ on the (semi)transparent layer including the above-described material.

In an embodiment, a capping layer (not shown) may further be disposed on the opposite electrode 213. The capping layer may include lithium fluoride (LiF), an inorganic material, and/or an organic material.

The thin-film encapsulation layer TFE may be disposed on the opposite electrode 213. In an embodiment, the thin-film encapsulation layer TFE may include at least one inorganic encapsulation layer and at least one organic encapsulation layer. FIG. 9 shows that the thin-film encapsulation layer TFE may include a first inorganic encapsulation layer 310, an organic encapsulation layer 320, and a second inorganic encapsulation layer 330, which may be sequentially stacked each other.

The first inorganic encapsulation layer 310 and the second inorganic encapsulation layer 330 may include at least one inorganic insulating material selected from aluminum oxide, titanium oxide, tantalum oxide, hafnium oxide, zinc oxide, silicon oxide, silicon nitride, and silicon oxynitride. The organic encapsulation layer 320 may include a polymer-based material. The polymer-based material may include at least one of acrylic resin, epoxy-based resin, polyimide, polyethylene, etc. In an embodiment, the organic encapsulation layer 320 may include acrylate.

Figure 10A:
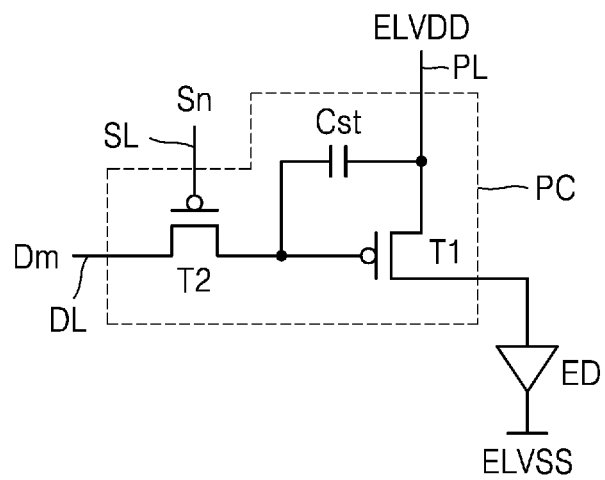
FIGS. 10A and 10B are schematic circuit diagrams of the display panel shown in FIG. 8.
Figure 10B:
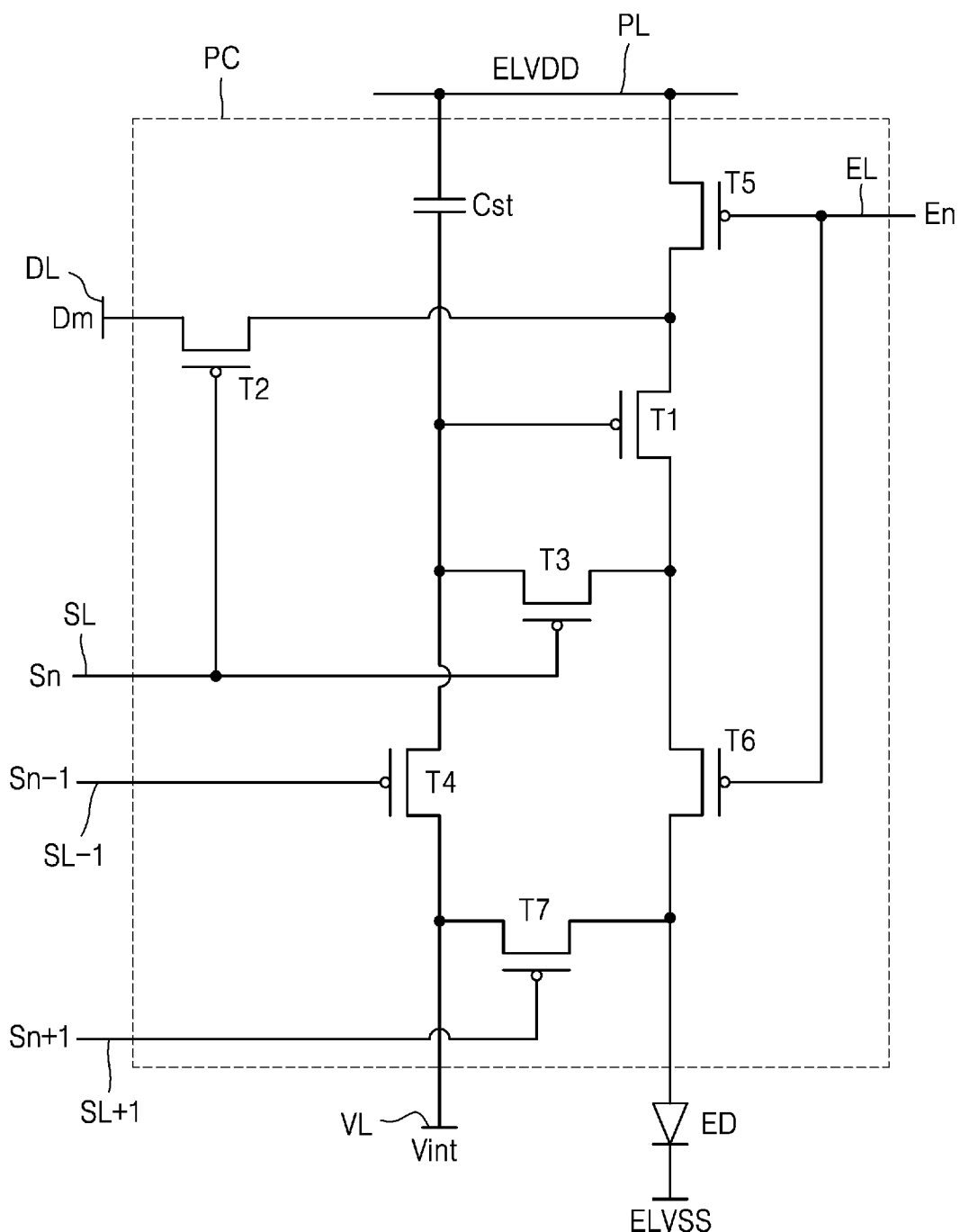

FIGS. 10A and 10B are schematic circuit diagrams of the display panel shown in FIG. 8.

Referring to FIGS. 10A and 10B, a pixel circuit PC may be connected to the display element ED to implement light emission of sub-pixels. The pixel circuit PC may include a driving thin-film transistor T1, a switching thin-film transistor T2, and the storage capacitor Cst. The switching thin-film transistor T2 may be connected to a scan line SL and a data line DL, and may be configured to transmit, to the driving thin-film transistor T1, a data signal Dm input through the data line DL, according to a scan signal Sn input through the scan line SL.

The storage capacitor Cst may be connected to the switching thin-film transistor T2 and a driving voltage line PL, and may be configured to store a voltage corresponding to a difference between a voltage received from the switching thin-film transistor T2 and a driving voltage ELVDD supplied to the driving voltage line PL.

The driving thin-film transistor T1 may be connected to the driving voltage line PL and the storage capacitor Cst, and may be configured to control a driving current flowing from the driving voltage line PL to the display element ED, in response to a voltage value stored in the storage capacitor Cst. The display element ED may emit light having a given luminance according to the driving current.

Although FIG. 10A illustrates a case where the pixel circuit PC may include two thin-film transistors and one storage capacitor, the disclosure is not limited to thereto.

Referring to FIG. 10B, the pixel circuit PC may include the driving thin-film transistor T1, the switching thin-film transistor T2, a compensation thin-film transistor T3, a first initialization thin-film transistor T4, an operation control thin-film transistor T5, an emission control thin-film transistor T6, and a second initialization thin-film transistor T7.

Although FIG. 10B illustrates a case where signal lines (for example, the scan line SL, a previous scan line SL−1, a subsequent scan line SL+1, an emission control line EL, and the data line DL), an initialization voltage line VL, and the driving voltage line PL are provided for each pixel circuit PC, the disclosure is not limited thereto. In an embodiment, at least one of the signal lines (for example, the scan line SL, the previous scan line SL−1, the subsequent scan line SL+1, the emission control line EL, and the data line DL) and the initialization voltage line VL may be shared by neighboring pixel circuits.

A drain electrode of the driving thin-film transistor T1 may be electrically connected to the display element ED via the emission control thin-film transistor T6. The driving thin-film transistor T1 may be configured to receive the data signal Dm according to a switching operation of the switching thin-film transistor T2 and supply a driving current to the display element ED.

A gate electrode of the switching thin-film transistor T2 may be connected to the scan line SL, and a source electrode of the switching thin-film transistor T2 may be connected to the data line DL. A drain electrode of the switching thin-film transistor T2 may be connected to a source electrode of the driving thin-film transistor T1 and connected to the driving voltage line PL via the operation control thin-film transistor T5.

The switching thin-film transistor T2 may be turned on according to the scan signal Sn transmitted through the scan line SL, and may be configured to perform a switching operation of transmitting the data signal Dm, transmitted through the data line DL, to the source electrode of the driving thin-film transistor T1.

A gate electrode of the compensation thin-film transistor T3 may be connected to the scan line SL. A source electrode of the compensation thin-film transistor T3 may be connected to the drain electrode of the driving thin-film transistor T1 and connected to a pixel electrode of the display element ED via the emission control thin-film transistor T6. A drain electrode of the compensation thin-film transistor T3 may be connected to any one electrode of the storage capacitor Cst, a source electrode of the first initialization thin-film transistor T4, and a gate electrode of the driving thin-film transistor T1. The compensation thin-film transistor T3 may be turned on according to the scan signal Sn transmitted through the scan line SL, and may be configured to diode-connect the driving thin-film transistor T1 by connecting the gate electrode of the driving thin-film transistor T1 and the drain electrode of the driving thin-film transistor T1 to each other.

A gate electrode of the first initialization thin-film transistor T4 may be connected to the previous scan line SL−1. A drain electrode of the first initialization thin-film transistor T4 may be connected to the initialization voltage line VL. The source electrode of the first initialization thin-film transistor T4 may be connected to any one electrode of the storage capacitor Cst, the drain electrode of the compensation thin-film transistor T3, and the gate electrode of the driving thin-film transistor T1. The first initialization thin-film transistor T4 may be turned on according to a previous scan signal Sn−1 transmitted through the previous scan line SL−1, and may be configured to perform an initialization operation of initializing a voltage of the gate electrode of the driving thin-film transistor T1 by transmitting an initialization voltage Vint to the gate electrode of the driving thin-film transistor T1.

A gate electrode of the operation control thin-film transistor T5 may be connected to the emission control line EL. A source electrode of the operation control thin-film transistor T5 may be connected to the driving voltage line PL. A drain electrode of the operation control thin-film transistor T5 may be connected to the source electrode of the driving thin-film transistor T1 and the drain electrode of the switching thin-film transistor T2.

A gate electrode of the emission control thin-film transistor T6 may be connected to the emission control line EL. A source electrode of the emission control thin-film transistor T6 may be connected to the drain electrode of the driving thin-film transistor T1 and the source electrode of the compensation thin-film transistor T3. A drain electrode of the emission control thin-film transistor T6 may be electrically connected to the pixel electrode of the display element ED. The operation control thin-film transistor T5 and the emission control thin-film transistor T6 may be simultaneously turned on according to an emission control signal En transmitted through the emission control line EL, and thus, the driving voltage ELVDD may be transmitted to the display element ED, and a driving current may flow through the display element ED.

A gate electrode of the second initialization thin-film transistor T7 may be connected to the subsequent scan line SL+1. A source electrode of the second initialization thin-film transistor T7 may be connected to the pixel electrode of the display element ED. A drain electrode of the second initialization thin-film transistor T7 may be connected to the initialization voltage line VL. The second initialization thin-film transistor T7 may be turned on according to a subsequent scan signal Sn+1 transmitted through the subsequent scan line SL+1, and may be configured to initialize the pixel electrode of the display element ED.

Although FIG. 10B illustrates a case where the first initialization thin-film transistor T4 and the second initialization thin-film transistor T7 are respectively connected to the previous scan line SL−1 and the subsequent scan line SL+1, the disclosure is not limited thereto. In an embodiment, both the first initialization thin-film transistor T4 and the second initialization thin-film transistor T7 may be connected to the previous scan line SL−1 and driven according to the previous scan signal Sn−1.

Another electrode of the storage capacitor Cst may be connected to the driving voltage line PL. Any one electrode of the storage capacitor Cst may be connected to the gate electrode of the driving thin-film transistor T1, the drain electrode of the compensation thin-film transistor T3, and the source electrode of the first initialization thin-film transistor T4.

An opposite electrode (for example, a cathode) of the display element ED may receive a common voltage ELVSS. The display element ED may receive a driving current from the driving thin-film transistor T1 and emit light.

The pixel circuit PC is not limited to the numbers of thin-film transistors and storage capacitors and the circuit design described with reference to FIGS. 10A and 10B, and the numbers of thin-film transistors and storage capacitors and the circuit design may be variously changed.

In the display apparatus according to one or more embodiments, in case that the display apparatus is unfolded, the occurrence of buckling in a display panel may be reduced. The display apparatus according to one or more embodiments may be unfolded with minimal force.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:
   a case;
   a moving portion configured to be inserted into the case and withdrawn from the case;
   a multi-joint structure inserted into the case or withdrawn from the case in case that the moving portion moves relative to the case;
   a display panel disposed on outer surfaces of the case and the multi-joint structure, maintained in a bent state on a side surface of the moving portion, and inserted into the case or withdrawn from the case in case that the moving portion moves relative to the case; and
   an elastic portion disposed on a side surface of the multi-joint structure and configured to press the multi-joint structure toward a surface of the display panel on which an image is displayed.

2. The display apparatus of claim 1, further comprising:
   a driver disposed between the moving portion and the case and configured to move the moving portion.

3. The display apparatus of claim 1, wherein a portion of the display panel disposed on the side surface of the moving portion is substantially round.

4. The display apparatus of claim 1, wherein the elastic portion has a substantially plate shape and is substantially rounded to protrude toward the display panel.

5. The display apparatus of claim 1, wherein the elastic portion comprises a metal or a carbon fiber-reinforced plastic.

6. The display apparatus of claim 1, further comprising:
   a protective member disposed between the display panel and the multi-joint structure.

7. The display apparatus of claim 1, wherein the multi-joint structure comprises:
   support members disposed on a first side of the elastic portion; and
   a locking portion having portions disposed on the first side of the elastic portion and a second side of the elastic portion opposite the first side, disposed on each of the support members, and having the elastic portion inserted into the portions of the locking portion.

8. The display apparatus of claim 7, wherein the support members are disposed apart from each other.

9. The display apparatus of claim 1, further comprising:
   a fixing portion disposed on the moving portion and having an end of the elastic portion fixed to the fixing portion.

10. The display apparatus of claim 9, wherein the elastic portion comprises:
    a first elastic portion disposed on a first side surface of the case and fixed to the fixing portion; and
    a second elastic portion disposed on a second side surface of the case and facing the first elastic portion, the second side surface being different from the first side surface.

11. The display apparatus of claim 10, wherein
    a portion of the first elastic portion is disposed on the case, and
    a portion of the second elastic portion is disposed below the case.

12. A display apparatus comprising:
    a case;
    a moving portion configured to be inserted into and withdrawn from the case;
    a multi-joint structure inserted into or withdrawn from the case in case that the moving portion moves relative to the case;
    a display panel disposed on outer surfaces of the case and the multi-joint structure, maintained in a bent state on a side surface of the moving portion, and inserted into or withdrawn from the case in case that the moving portion moves relative to the case; and
    an elastic portion disposed on a side surface of the multi-joint structure, the elastic portion having a section with a substantially round cross-sectional shape that is perpendicular to a longitudinal direction of the elastic portion with at least a portion of the multi-joint structure disposed directly between the display panel and the elastic portion at the section with the substantially round cross-sectional shape so as to keep the elastic portion spaced apart from the display panel.

13. The display apparatus of claim 12, wherein a portion of the elastic portion having the substantially round cross-sectional shape protrudes toward the display panel.

14. The display apparatus of claim 12, further comprising:
    a driver connected to the moving portion and configured to move the moving portion.

15. The display apparatus of claim 12, wherein the multi-joint structure comprises:
    support members disposed apart from each other; and
    a locking portion disposed on each of the support members and configured to fix the elastic portion.

16. The display apparatus of claim 12, further comprising:
    a fixing portion disposed on the moving portion, having an end of the elastic portion fixed to the fixing portion, and configured to wind or unwind the elastic portion in case that the moving portion moves relative to the case.

17. The display apparatus of claim 16, wherein the elastic portion comprises:
    a first elastic portion partially fixed to an end of the fixing portion; and
    a second elastic portion partially fixed to another end of the fixing portion.

18. The display apparatus of claim 17, wherein a direction in which the first elastic portion is wound around the fixing portion is opposite to a direction in which the second elastic portion is wound around the fixing portion.

19. The display apparatus of claim 12, wherein the elastic portion comprises a metal or a carbon fiber-reinforced plastic.

20. The display apparatus of claim 12, further comprising:
    a protective member disposed between the display panel and the multi-joint structure.

* * * * *